(12) United States Patent
Yoon et al.

(10) Patent No.: US 7,289,818 B2
(45) Date of Patent: Oct. 30, 2007

(54) SHORT MESSAGE SERVICE BETWEEN PRIVATE WIRELESS NETWORK SYSTEMS IN MULTI-ZONE ARRANGEMENT

(75) Inventors: Ki-Heon Yoon, Seongnam-si (KR); Tai-Yoon Lee, Suwon-si (KR); Joo-Hong Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 117 days.

(21) Appl. No.: 10/987,098

(22) Filed: Nov. 15, 2004

(65) Prior Publication Data

US 2005/0124302 A1   Jun. 9, 2005

(30) Foreign Application Priority Data

Dec. 3, 2003   (KR) ................ 10-2003-0087350

(51) Int. Cl.
*H04Q 7/20* (2006.01)

(52) U.S. Cl. ............ 455/466; 455/412.1; 455/412.2

(58) Field of Classification Search ............ 455/412.1, 455/412.2, 414.1, 414.2, 414.3, 428, 466, 455/403, 433, 435.1
See application file for complete search history.

(56) References Cited

U.S. PATENT DOCUMENTS

| 6,169,494 | B1 | 1/2001 | Lopes |
| 6,970,719 | B1* | 11/2005 | McConnell et al. ...... 455/554.1 |
| 7,027,825 | B2* | 4/2006 | Mizell et al. ................ 455/466 |
| 7,065,372 | B2* | 6/2006 | Ham .......................... 455/466 |
| 2001/0030957 | A1 | 10/2001 | McCann et al. |
| 2002/0061745 | A1 | 5/2002 | Ahn et al. |
| 2002/0173320 | A1 | 11/2002 | Aitken et al. |
| 2002/0183081 | A1 | 12/2002 | Alvarez |
| 2002/0193127 | A1 | 12/2002 | Martschitsch |

(Continued)

FOREIGN PATENT DOCUMENTS

JP   11-18135   1/1999

(Continued)

OTHER PUBLICATIONS

Australian Office Action of the Australian Patent Application No. 2004212576, issued on Dec. 5, 2005.

(Continued)

*Primary Examiner*—CongVan Tran
(74) *Attorney, Agent, or Firm*—Robert E. Bushnell, Esq.

(57) ABSTRACT

In a Short Message Service (SMS) between private wireless network systems in a multi-zone arrangement, when private wireless network systems, which have been separately placed, are configured in one service area called a multi-zone arrangement, Home Location Register (HLR) information is periodically updated and synchronized through interfacing between the private wireless network systems in the multi-zone arrangement, and making it possible to determine whether or not a receiving terminal is positioned in a service area of which of the private wireless network systems using the synchronized HLR information. An SMS transmission is requested to a call processor of the associated private wireless network system to allow performing SMS message transmission to the associated terminal. That is, it allows an automatic SMS incoming operation at the associated private wireless network system using HLR database information updated periodically, without a separate request for position registration and specific option set by a user.

6 Claims, 15 Drawing Sheets

U.S. PATENT DOCUMENTS

| | | |
|---|---|---|
| 2003/0013464 A1 | 1/2003 | Henry-Labordere |
| 2003/0045309 A1 | 3/2003 | Knotts |
| 2003/0144015 A1 | 7/2003 | Ham |
| 2003/0147382 A1* | 8/2003 | Neuman .................... 370/352 |
| 2003/0154257 A1 | 8/2003 | Hantsch et al. |
| 2004/0005901 A1 | 1/2004 | Ala-Luukko |
| 2004/0110489 A1 | 6/2004 | Muri et al. |

FOREIGN PATENT DOCUMENTS

| | | |
|---|---|---|
| JP | 2001-016632 | 1/2001 |
| JP | 2002-064851 | 2/2002 |
| JP | 2002-159072 | 5/2002 |
| WO | WO 00/42790 | 7/2000 |
| WO | WO 00/56091 | 9/2000 |
| WO | WO 02/41641 | 5/2002 |

OTHER PUBLICATIONS

Japanese Office Action of the Japanese Patent Application No. 2004-345730, issued on Aug. 8, 2006.

Japanese Office Action corresponding to Japanese Patent Application No. 2004-345730, issued on Feb. 27, 2007.

Australian Office Action corresponding to Australian Patent Application No. 2004212576, issued on Dec. 21, 2006.

* cited by examiner

FIG.5

| HLR, VLR DB ||
|---|---|
| MS_Tel[4] | |
| | |
| MS_Min[10].... ||
| Cos | Tenant |
| org_hlr_id | CurRegistedLoc |
| MCC_MNC_LEN | MCC_MNC_0 |
| ESNNumber | |
| | |
| Name[16]..... ||
| ⋮ ||
| Public_State | Barring_State |
| pbx_sys_id | PubTEM_Ext |
| PageSYSID | reserved_4 |
| reserved_5 | PwrOn_LocUp |
| PBX_Tel[4] | |
| | |
| mdn[16]..... ||
| imsi[16]..... ||
| reserved_6[20] ||

FIG. 15

| Offset | CONTENTS | Size(Byte) | NOTE |
|---|---|---|---|
| 0 | MESSAGE SEPARATOR | 1 | 0 x 01 |
| 1 | MESSAGE TYPE | 1 | 0 x 0A - SUBSCRIBER INFORMATION ADDITION<br>0 x 0C - SUBSCRIBER INFORMATION ALTERATION<br>0 x 0D - SUBSCRIBER INFORMATION DELETION |
| 2 | Req_Ack | 1 | 0 x 00 - SYNCHRONIZATION REQUEST<br>0 x 01 - SYNCHRONIZATION ACKNOWLEDGEMENT |
| 3 | Self HLR ID | 1 | THE SELF HLR ID |
| 4 | Opp. HLR ID | 1 | OPPONENT HLR ID |
| 5 | Reserved1 | 1 | 0 x FF |
| 6 | SYNCHRONIZATION SUBSCRIBER INFORMATION | 152 | ASSOCIATED SUBSCRIBER INFORMATION RECORD (PRACTICALLY ADDED/DELETED/ALTERED SUBSCRIBER INFORMATION) |

SHORT MESSAGE SERVICE BETWEEN PRIVATE WIRELESS NETWORK SYSTEMS IN MULTI-ZONE ARRANGEMENT

CLAIM OF PRIORITY

This application makes reference to, incorporates the same herein, and claims all benefits accruing under 35 U.S.C. § 119 from an application for METHOD AND SYSTEM FOR SHORT MESSAGE SERVICE BETWEEN PRIVATE WIRELESS NETWORK SYSTEMS IN MULTI-ZONE earlier filed in the Korean Intellectual Property Office on 3 Dec. 2003 and there duly assigned Serial No. 2003-87350.

BACKGROUND OF THE INVENTION

1. Field of the Invention

The present invention relates to Short Message Service (SMS) between private wireless network systems in a multi-zone arrangement and, more particularly, to SMS between private wireless network systems in a multi-zone arrangement in which, when a subscriber subscribed to each private wireless network system in different zones moves from one service area to another service area in the private wireless network system in the multi-zone arrangement, the subscriber can receive SMS from the private wireless network system in the area that the subscriber has moved to.

2. Description of the Related Art

The private wireless network systems in the multi-zone arrangement are configured as a single system in which the same kind of private wireless network systems are positioned in different zones. The system is adapted to allow a wireless terminal to receive a call roaming service and other additional services (e.g., an SMS service) by transferring subscriber information between the private wireless network systems, when each wireless terminal registered in the private wireless network systems positioned in the different zones moves from a service area of the private wireless network system on which the terminal has been registered into a service area of another private wireless network system. That is, it is a system in which respective private wireless network systems positioned in the multi-zone arrangement are configured to act like one private wireless network system, such that although a wireless terminal moves into a service area of a private wireless network system in any zone, it can receive a variety of services from the private wireless network system in the associated zone.

Typically, the private wireless network systems perform services only for subscriber terminals registered in the associated system. Thus, if the associated wireless terminal moves into a service area of a private wireless network system in another zone, the terminal cannot receive any service from the private wireless network system in the zone that the terminal has moved to. That is, the wireless terminal registered in the associated private wireless network system can receive an outgoing call service, an incoming call service and any other functional services, such as an SMS service, only in the private wireless network system on which the terminal has been registered.

As a result, the private wireless network system according to the prior art could offer a call service and other additional services, such as the SMS service, only to wireless terminal subscribers registered in its own system. Consequently, when a wireless terminal registered in the private wireless network system moves into a service area of a private wireless network system in another zone, the call service and the SMS service are not available. That is, the SMS service in the conventional private wireless network system could be offered only to the terminals that have been registered in one private wireless network system and positioned in the service area of the associated system.

For example, assuming that two private wireless network systems have been disposed in New York City and Boston, respectively, SMS message transmission between home users of the two private wireless network systems was impossible since there is no interfacing between these two systems.

The following patents each discloses features in common with the present invention but do not teach or suggest the inventive features specifically recited in the present application: U.S. Patent Application No. 2001/0030957 to McCann et al., entitled METHODS AND SYSTEMS FOR ROUTING MESSAGES IN A COMMUNICATIONS NETWORK, published on 18 Oct. 2001; U.S. Patent Application No. 2002/0061745 to Ahn et al., entitled ROAMING SERVICE SYSTEM FOR GSM SERVICE SUBSCRIBER IN CDMA SERVICE AREA, AND METHOD FOR REGISTERING LOCATIONS AND TRANSMITTING AND RECEIVING SIGNALS AND SHORT MESSAGES USING THE SYSTEM, published on 23 May 2002; U.S. Patent Application No. 2002/0173320 to Aitken et al., entitled SHORT MESSAGE GATEWAY, published on 21 Nov. 2002; U.S. Patent Application No. 2002/0183081 to Elizondo Alvarez, entitled PROVISION OF SHORT MESSAGE SERVICES, published on 5 Dec. 2002; U.S. Patent Application No. 2002/0193127 to Martschitsch, entitled METHOD AND SYSTEM FOR PREPARING AND TRANSMITTING SMS MESSAGES IN A MOBILE RADIO NETWORK, published on 19 Dec. 2002; U.S. Patent Application No. 2003/0013464 to Jean Henry-Labordere, entitled IMPLEMENTATION OF SHORT MESSAGES SENDING TO MOBILE NETWORKS WITH MOBILE NUMBER PORTABILITY OR INCOMPLETE NUMBERING PLANS WITH AUTOLEARNING, published on 16 Jan. 2003; U.S. Patent Application No. 2003/0045309 to Knotts, entitled INTER-CARRIER SHORT MESSAGING SERVICE PROVIDING PHONE NUMBER ONLY EXPERIENCE, published on 6 Mar. 2003; U.S. Patent Application No. 2003/0154257 to Hantsch et al., entitled METHOD AND DEVICE FOR FORWARDING SHORT MESSAGES FROM A MOBILE TERMINAL published on 14 Aug. 2003; U.S. Patent Application No. 2004/0005901 to Ala-Luukko, entitled METHOD AND SYSTEM FOR ROUTING OF SHORT MESSAGES IN A TELECOMMUNICATION SYSTEM, published on 8 Jan. 2004; and U.S. Patent Application No. 2004/0110489 to Murri et al., entitled METHOD AND DEVICE FOR HANDLING TELEPHONE CALLS DIRECTED TO NON-REACHABLE MOBILE PHONES, published on Jun. 10, 2004.

SUMMARY OF THE INVENTION

It is, therefore, an object of the present invention to provide SMS service between private wireless network systems in a multi-zone arrangement in which private wireless network systems have been separately placed and are configured in a single service area called a multi-zone arrangement. HLR information (i.e., subscriber information) is periodically updated and synchronized through interfacing between the private wireless network systems in the multi-zone arrangement, so that a determination is made as to which private wireless network system a receiving terminal is positioned within a service area of using the synchronized HLR information, and an SMS transmission is requested to a call processing module (i.e., pBSC) of the associated private wireless network system to allow an SMS message transmission to the associated terminal.

That is, it is an object of the present invention to provide SMS service between private wireless network systems in a multi-zone arrangement, which makes automatic home call and SMS incoming services possible in an associated private wireless network system using periodically updated HLR database information without requesting separate position registration or performing specific option setting by a user.

It is, another object of the present invention to provide SMS service between private wireless network systems in a multi-zone arrangement, in which if a multiple destination function is set to both a home terminal (DGP) and a wireless terminal, is sent to the PBX in which the home terminal is included to thereby display the message and an SMS message is sent via a pBSC of a private wireless network system in an associated zone, thus allowing a multiple destination function for the SMS.

According to one embodiment of the present invention for achieving the objects, a method is provided comprising: synchronizing subscriber information databases over a network with respect to subscriber information of each subscriber registered among a plurality of wireless network systems in a multi-zone arrangement; and upon a Short Message Service (SMS) transmission request signal from a first terminal to at least one second terminal being received, forming data packets of an SMS message in accordance with the received SMS transmission request signal, and retrieving the synchronized subscriber information database to send the formed SMS data packets over the network to a wireless network system corresponding to current position information of the at least one second terminal.

The network can comprise an IP network.

The first terminal can comprise one of wired and wireless terminals registered in the wireless network system for requesting transmission of SMS messages, and wherein the at least one second terminal comprises one of wired and wireless terminals for receiving SMS messages.

Synchronizing subscriber information databases can comprise: a first synchronization to synchronize the subscriber information between Home Location Registers (HLRs) of the wireless network systems in the multi-zone arrangement over the network; and a second synchronization step to synchronize the subscriber information between SMS databases of SMS servers in associated wireless network systems where each of the HLRs is positioned after the first synchronization between the respective HLRs has been completed.

The first synchronization can comprise: an initial synchronization between the HLRs over an Internet Protocol (IP) network with respect to subscriber information of a terminal registered in its own system upon initial setup of the wireless network systems in the multi-zone arrangement, the synchronization being in accordance with a set system ID; synchronization of the subscriber information upon a request to alter or delete the subscriber information from a user through a User Interface (UI) after the initial synchronization has been completed, the synchronization being performed by updating the HLR of the system with the altered or deleted subscriber information and, thereafter, by sending the updated subscriber information to the HLRs of interfaced wireless network systems in respective zones in accordance with the set system ID over the IP network; and synchronization of the subscriber information due to position registration modification upon a position registration message being received from an arbitrary wireless terminal after the initial synchronization process has been completed, the synchronization being performed by updating position registration and subscriber information in its own HLR and, thereafter, by sending the updated subscriber information to each of the interfaced wireless network systems in the multi-zone arrangement over the IP network, upon a determination that the wireless terminal has moved from a service area of the system in which the wireless terminal has been registered to its own service area based on position information of the received message.

The second synchronization can comprise synchronization between the HLR and the SMS database by periodically reading the subscriber information updated through the synchronization between the HLRs of the wireless network systems in the multi-zone arrangement and by updating the SMS database with the read subscriber information.

Upon the at least one second terminal being currently positioned in a service area of a wireless network system in another zone, the formed SMS data packets can be transferred over the network to an IP address of the wireless network system in the associated position.

The synchronized subscriber information stored in the subscriber information database can comprise current position information of all terminals registered in the wireless network systems in the multi-zone arrangement, and IP address information of a wireless network system where the terminal is currently positioned.

According to another embodiment of the present invention for achieving the objects, a method is provided comprising: synchronizing subscriber information over a network between Home Location Registers (HLRs) of a plurality of wireless network systems in a multi-zone arrangement; synchronizing subscriber information over the network between each of the HLRs and a Short Message Service (SMS) database of an SMS server in an associated wireless network system where the HLR is positioned; upon an SMS transmission request signal from a first terminal to at least one second terminal being received over the network, forming data packets of an SMS message in accordance with the received SMS transmission request signal, and retrieving current position information of the at least one second terminal to which SMS is to be sent and an Internet Protocol (IP) address of an interfaced wireless network system corresponding to the current position of the second terminal, by accessing the synchronized SMS database; and sending the formed data packets of the SMS message to the retrieved IP address over the network.

According to still another embodiment of the present invention for achieving the objects, a plurality of wireless network systems in a multi-zone arrangement in a network is provided, each of the plurality of wireless network systems comprising: a synchronizer adapted to synchronize subscriber information databases over the network with respect to subscriber information of each subscriber registered among a plurality of wireless network systems; and a Short Message Service (SMS) message processor adapted to form data packets of an SMS message in accordance with a received SMS transmission request signal, and to access the synchronized subscriber information database to send the formed SMS data packets over the network to a wireless network system corresponding to current position information of at least one second terminal, upon the SMS transmission request signal from a first terminal being received by the at least one second terminal.

The network can comprise an Internet Protocol (IP) network.

The first terminal can comprise one of wired and wireless terminals registered in the wireless network system for requesting transmission of the SMS message, and the at least one second terminal comprises one of wired and wireless terminals for receiving the SMS message.

The synchronizer can be adapted to perform: an initial synchronization between subscriber information databases of the interfaced wireless network systems over the IP network with respect to subscriber information of a terminal registered in its own system upon initial setup of the wireless network systems in the multi-zone arrangement, the synchronization being in accordance with a set system ID; synchronization of the subscriber information upon a request to alter or delete the subscriber information from a user through a User Interface (UI) after the initial synchronization has been completed, the synchronization being performed by updating its own subscriber information database with the altered or deleted subscriber information and by then sending the updated subscriber information to the subscriber information databases of interfaced wireless network systems in respective zones in accordance with the set system ID over the IP network; and synchronization of the subscriber information due to position registration modification upon a position registration message being received from an arbitrary wireless terminal after the initial synchronization process has been completed, the synchronization being performed by updating position registration and subscriber information in its own subscriber information database and, thereafter, by sending the updated subscriber information to each of the interfaced wireless network systems in the multi-zone arrangement over the IP network, upon a determination that the wireless terminal has moved from a service area of the system on which the wireless terminal has been registered to its own service area based on position information of the received message.

The SMS message processor can comprise: an SMS database adapted to store the same subscriber information as the subscriber information stored in the subscriber information database; a synchronization processor adapted to periodically access the subscriber information database to read the subscriber information stored in the subscriber information database and to update the SMS database to synchronize the subscriber information; and wherein the SMS message processor is adapted to perform: forming the data packets of the SMS message according to a received SMS transmission request signal and, thereafter, temporarily storing the formed SMS message data packets into a message queue, upon the SMS transmission request signal from the first terminal to the at least one second terminal being received over the network, and retrieving current position information of the at least one second terminal to which the SMS message is to be sent and an IP address of an interfaced wireless network system corresponding to the current position by accessing the SMS database, and sending the SMS message data packets stored in the message queue to the retrieved IP address over the network.

The subscriber information database can comprise at least one of a Home Locator Register (HLR) and a Visitor Location Register (VLR).

According to yet another embodiment of the present invention for achieving the objects, a plurality of wireless network systems in a multi-zone arrangement in a network is provided, each of the plurality of wireless network systems comprising: a synchronizer adapted to synchronize subscriber information between the plurality of wireless network systems by updating its own subscriber information database with subscriber information registered upon setup of each of the wireless network systems, subscriber information modified upon modification of subscriber information via a User Interface (UI), and with subscriber information of a terminal of which the position registration is modified upon movement between service areas of the wireless network systems in the multi-zone arrangement and, thereafter, by sending the information to a subscriber information database of each of the interfaced wireless network systems over the network; and a Short Message Service (SMS) message processor adapted to retrieve current position information of a second terminal and an Internet Protocol (IP) address of an interfaced private wireless network system corresponding to the current position by accessing the subscriber information synchronized by the synchronizer, and to send an SMS message to the private wireless network system corresponding to the retrieved IP address over the network, upon an SMS transmission request signal from a first terminal to the at least one second terminal being received over the network.

According to another embodiment of the present invention for achieving the objects, a program storage device, readable by a machine, tangibly embodying a program of instructions executable by the machine to perform a method is provided, the method comprising: synchronizing subscriber information databases over a network with respect to subscriber information of each subscriber registered among a plurality of wireless network systems in a multi-zone arrangement; and upon a Short Message Service (SMS) transmission request signal from a first terminal to at least one second terminal being received, forming data packets of an SMS message in accordance with the received SMS transmission request signal, and retrieving the synchronized subscriber information database to send the formed SMS data packets over the network to a wireless network system corresponding to current position information of the at least one second terminal.

The network can comprise an IP network.

The first terminal can comprise one of wired and wireless terminals registered in the wireless network system for requesting transmission of SMS messages, and wherein the at least one second terminal comprises one of wired and wireless terminals for receiving SMS messages.

The synchronizing subscriber information databases can comprise: a first synchronization to synchronize the subscriber information between Home Location Registers (HLRs) of the wireless network systems in the multi-zone arrangement over the network; and a second synchronization step to synchronize the subscriber information between SMS databases of SMS servers in associated wireless network systems where each of the HLRs is positioned after the first synchronization between the respective HLRs has been completed.

The first synchronization can comprise: an initial synchronization between the HLRs over an Internet Protocol (IP) network with respect to subscriber information of a terminal registered in its own system upon initial setup of the wireless network systems in the multi-zone arrangement, the synchronization being in accordance with a set system ID; synchronization of the subscriber information upon a request to alter or delete the subscriber information from a user through a User Interface (UI) after the initial synchronization has been completed, the synchronization being performed by updating the HLR of the system with the altered or deleted subscriber information and, thereafter, by sending the updated subscriber information to the HLRs of interfaced wireless network systems in respective zones in accordance with the set system ID over the IP network; and synchronization of the subscriber information due to position registration modification upon a position registration message being received from an arbitrary wireless terminal after the initial synchronization process has been completed, the synchronization being performed by updating position registration and subscriber information in its own HLR and, thereafter, by sending the updated subscriber information to each of the interfaced wireless network systems in the multi-zone arrangement over the IP network, upon a determination that the wireless terminal has moved from a service area of the system in which the wireless terminal has been registered to its own service area based on position information of the received message.

The second synchronization can comprise synchronization between the HLR and the SMS database by periodically reading the subscriber information updated through the synchronization between the HLRs of the wireless network systems in the multi-zone arrangement and by updating the SMS database with the read subscriber information.

Upon the at least one second terminal being currently positioned in a service area of a wireless network system in another zone, the formed SMS data packets can be transferred over the network to an IP address of the wireless network system in the associated position.

The synchronized subscriber information stored in the subscriber information database can comprise current position information of all terminals registered in the wireless network systems in the multi-zone arrangement, and IP address information of a wireless network system where the terminal is currently positioned.

According to yet another embodiment of the present invention for achieving the objects, a program storage device, readable by a machine, tangibly embodying a program of instructions executable by the machine to perform a method is provided, the method comprising: synchronizing subscriber information over a network between Home Location Registers (HLRs) of a plurality of wireless network systems in a multi-zone arrangement; synchronizing subscriber information over the network between each of the HLRs and a Short Message Service (SMS) database of an SMS server in an associated wireless network system where the HLR is positioned; upon an SMS transmission request signal from a first terminal to at least one second terminal being received over the network, forming data packets of an SMS message in accordance with the received SMS transmission request signal, and retrieving current position information of the at least one second terminal to which SMS is to be sent and an Internet Protocol (IP) address of an interfaced wireless network system corresponding to the current position of the second terminal, by accessing the synchronized SMS database; and sending the formed data packets of the SMS message to the retrieved IP address over the network.

BRIEF DESCRIPTION OF THE DRAWINGS

A more complete appreciation of the present invention, and many of the attendant advantages thereof, will be readily apparent as the same becomes better understood by reference to the following detailed description when considered in conjunction with the accompanying drawings, in which like reference symbols indicate the same or similar components wherein;

FIG. 5 is a view of database structures of an HLR and a VLR in a private wireless network system in a multi-zone arrangement;

FIG. 15 is a view of a data structure comprised in a synchronization request message and a synchronization request acknowledgment message according to the present invention.

DETAILED DESCRIPTION OF THE INVENTION

Figure 1:
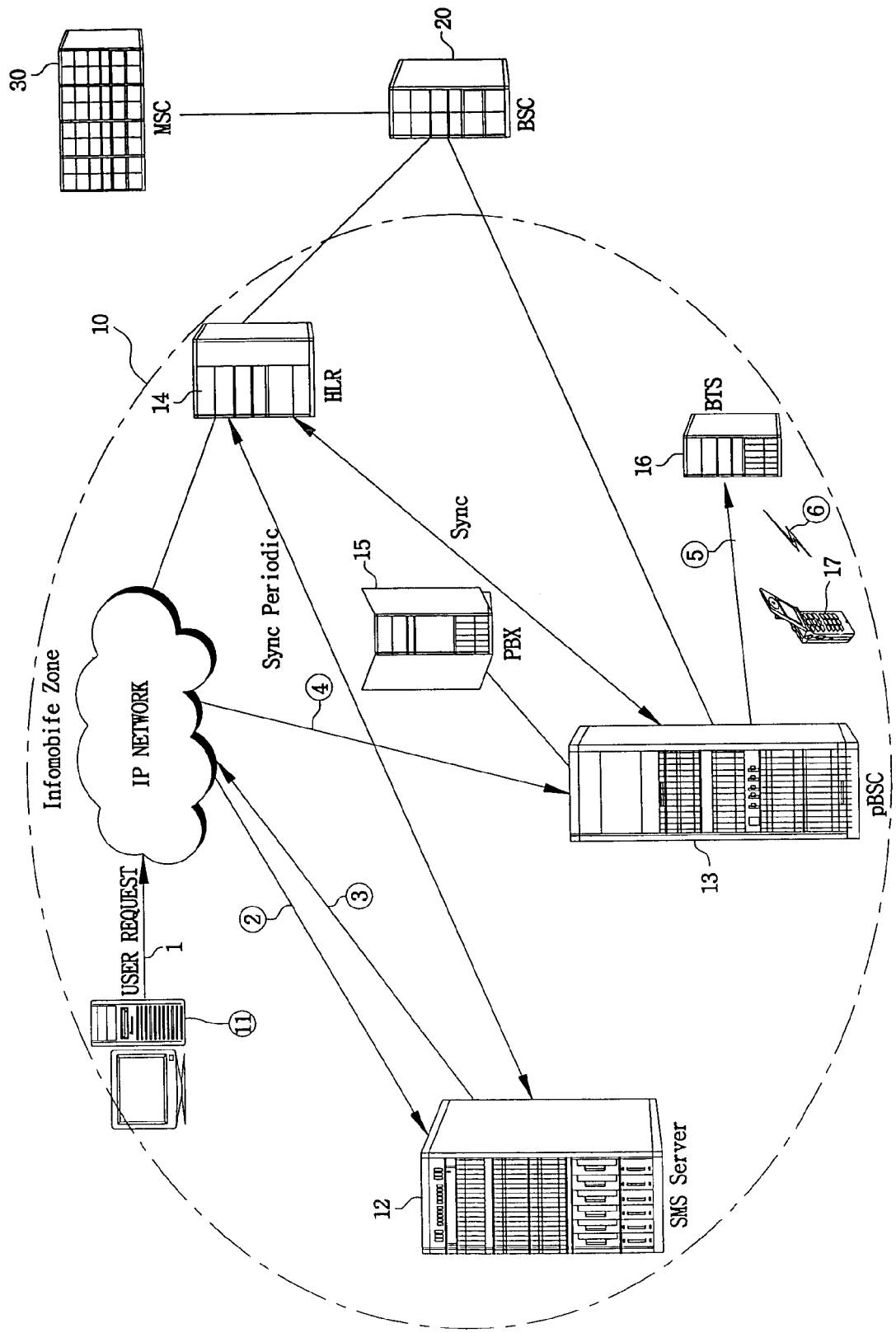
FIG. 1 is a view of a configuration of a private wireless network system and an SMS flow using the system.

FIG. 1 is a view of a configuration of a private wireless network system and SMS flow using such a system.

As shown in FIG. 1, a private wireless network system 10 is connected to a public Base Station Controller (BSC) 20 and in turn the public BSC 20 is connected to a public Mobile Switching Center (MSC) 30.

Further, the private wireless network system 10 can comprise wired and wireless terminals 11 and 17, a private Private Branch Exchange (PBX) 15, a Base Transceiver Station (BTS) 16, a public Base Station Controller ( ) 13, a Home Location Register (HLR) 14 and an SMS server 12. The wired terminal 11 and SMS server 12 are respectively connected to an Internet Protocol (IP) Network.

The SMS server 12 can comprise a web server (not shown) connected to the wired terminal 11 over the IP network when there is a connection for an SMS service request from the wired terminal 11 over the IP network, and a database (not shown) that stores subscriber information for providing the SMS service for the wireless terminal 17 registered in the system 10 and positioned in a service area of the system 10. The database in the SMS server 12 interfaces with the HLR 14 to periodically update the subscriber information registered in the HLR.

Furthermore, the pBSC 13 comprises a Visitor Location Register (not shown) (VLR), and the VLR is synchronized with the HLR 14 to store the same subscriber information.

The operation for the SMS service in the private wireless network system having such the configuration noted above is described below.

First, if there is an SMS service request from the wired terminal 111 to the SMS server 12 over the IP network, the SMS server 12 forms the SMS message requested by a user, and retrieves subscriber information of a party wireless terminal 17 requested by the user in the database of its own server, synchronized to the HLR 14, to identify the position of the associated wireless terminal.

If the wireless terminal 17 is presently positioned in the service area of the private wireless network system 10, the server sends the formed SMS message to the pBSC 13 over the IP network. In response thereto, the pBSC 13 sends the associated message via the BTS 16 to the associated wireless terminal 17.

Hereinafter, a method and system for SMS between private wireless network systems in a multi-zone arrangement according to an embodiment of the present invention is described in detail below with reference to the accompanying drawings.

Figure 2:
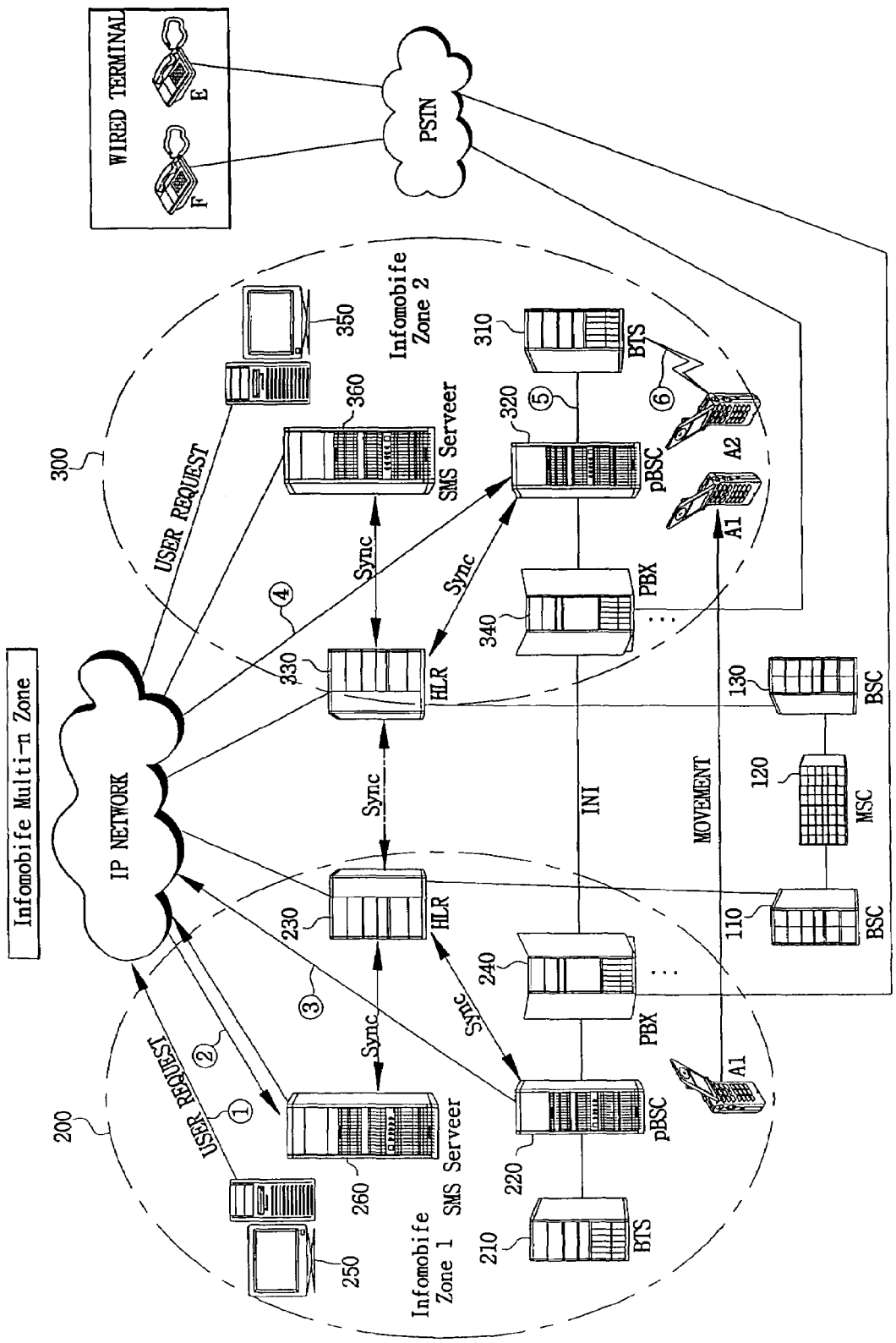
FIG. 2 is a view of a configuration for connection between private wireless network systems enabling SMS between the private wireless network systems in a multi-zone arrangement according to an embodiment of the present invention.

FIG. 2 is a view of a configuration for connection between private wireless network systems in a multi-zone arrangement capable of SMS between the private wireless network systems in the multi-zone arrangements according to an embodiment of the present invention.

As shown in FIG. 2, the multi-zone arrangement private wireless network system according to an embodiment of the present invention comprises a plurality of private wireless network systems 200 and 300 positioned in different zones and having different service areas, and a public mobile communication network, namely, BSCs 110 and 130 and MSC 120 respectively connected to the private wireless network systems 200 and 300. Although private wireless network systems are shown as being the private wireless network systems 200 and 300 for two zones in FIG. 2, they can be respectively connected to respective private wireless networks positioned in a plurality of zones. That is, although only two racks are shown in FIG. 2, the present invention is also applicable to N racks.

The private wireless network systems 100 and 200 positioned in the respective zones and having different service areas can be composed of a plurality of wireless terminal devices A1 and A2 registered in the associated system, BTSs 210 and 310, pBSCs 220 and 320, HLRs 230 and 330, and PBXs 240 and 340.

The BSCs 110 and 130 of the public mobile communication network can be connected to the HLRs 230 and 330 and the pBSCs 220 and 320 of the private wireless network systems 200 and 300.

The PBX 240 of the private wireless network system 200 and the PBX 340 of the private wireless network system 300 are interconnected by an INI interface dedicated line (e.g., a T1 line) to interface a call signal for voice or data communication between wired and wireless terminal devices respectively registered in the respective private wireless network systems 200 and 300. A detailed technique on the interface INI through the dedicated line TI is discussed in a previously filed application by the applicant on Apr. 6, 1998 as Korean Patent Application No. 10-1998-0012065, and therefore, a detailed explanation on the technique has been omitted for the sake of brevity.

Furthermore, each of the HLRs 230 and 330 of the private wireless network systems 200 and 300 positioned in the respective zones is connected to the IP network so that subscriber information is synchronized (or, shared) therebetween for roaming service between the private wireless network systems in the respective zones. Wired terminals E and F are respectively connected to a Public Switched Terminal Network (PSTN). It is noted that zone 1 and zone 2 as shown in FIG. 2 can be very remote from each other geographically.

The HLRs 230 and 330 in the private wireless network systems 200 and 300 perform a function for a subscriber position registration and a database function of storing the subscriber information. VLRs comprised in the pBSCs 220 and 330 are databases for temporarily storing subscriber information of any wireless terminal visiting the service area of the associated private wireless network system. The subscriber information stored in the HLR and VLR of the private wireless network systems 200 and 300 positioned in the respective zones is synchronized to each other over the IP network upon system initialization, upon subscriber information alteration/addition/deletion and upon a wireless terminal's movement into a service area of a private wireless network system in the different zone, such that even when a terminal registered in a private wireless network system in one zone moves into a service area of a private wireless network system in another zone, the terminal receives a call service and SMS service depending on the subscriber information stored in the HLR and VLR of the associated zone into which the terminal has moved. A method for synchronization of the subscriber information in the HLR and VLR of respective private wireless network systems 200 and 300 is described in detail below.

If there is an SMS transmission request from the wired terminals 250 and 350 over the IP network, the SMS servers 260 and 360 of the private wireless network systems 200 and 300 in the multi-zone arrangement of FIG. 2 identify current position information of the SMS incoming terminal to send an SMS message over the IP network to the IP address of the pBSC of the private wireless network system at the associated position.

Such SMS servers 260 and 360 are specifically described below with reference to FIGS. 3 and 4.

Figure 3:
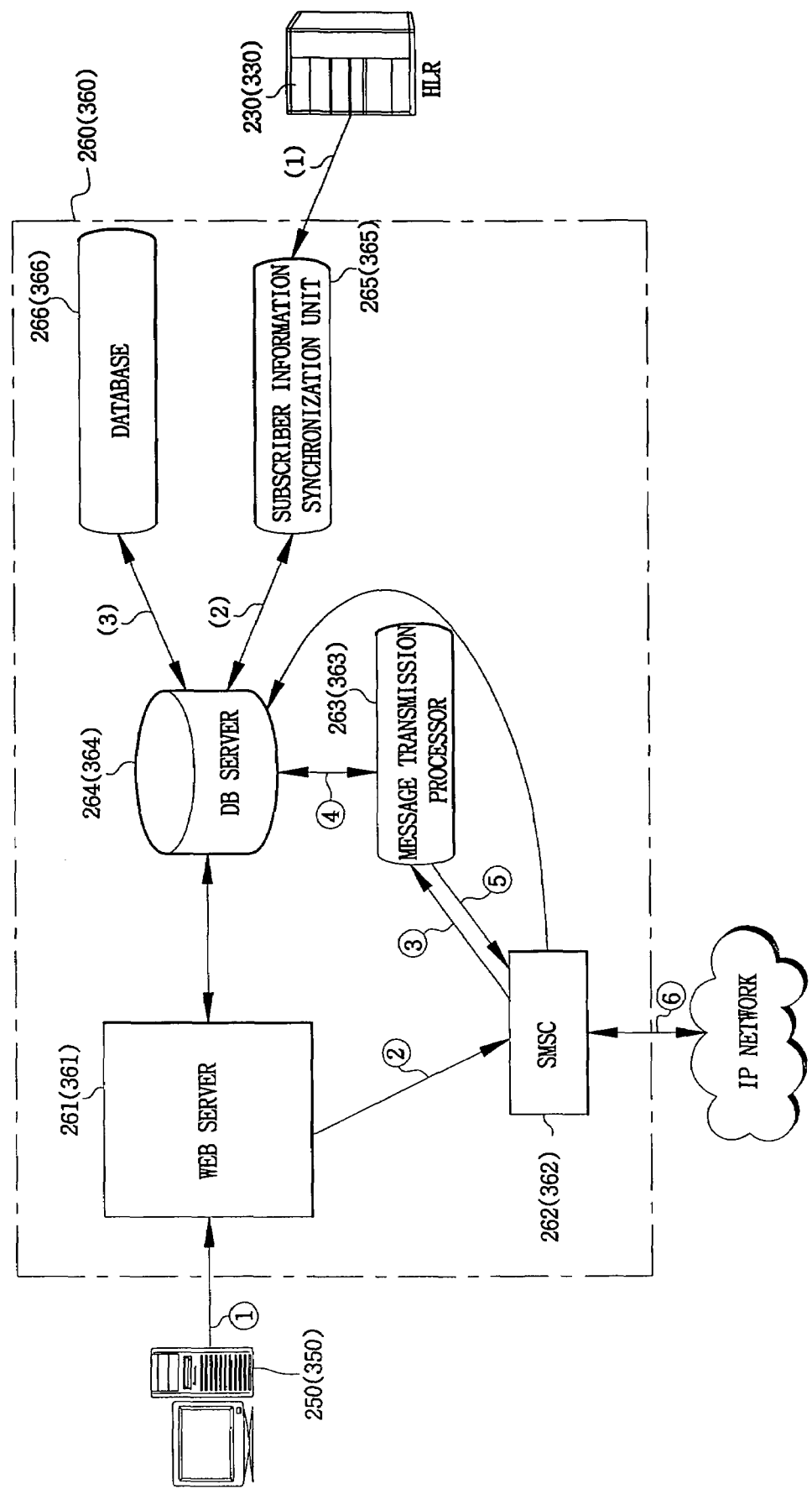
FIG. 3 is a detailed block diagram of the SMS server of FIG. 2.
Figure 4:
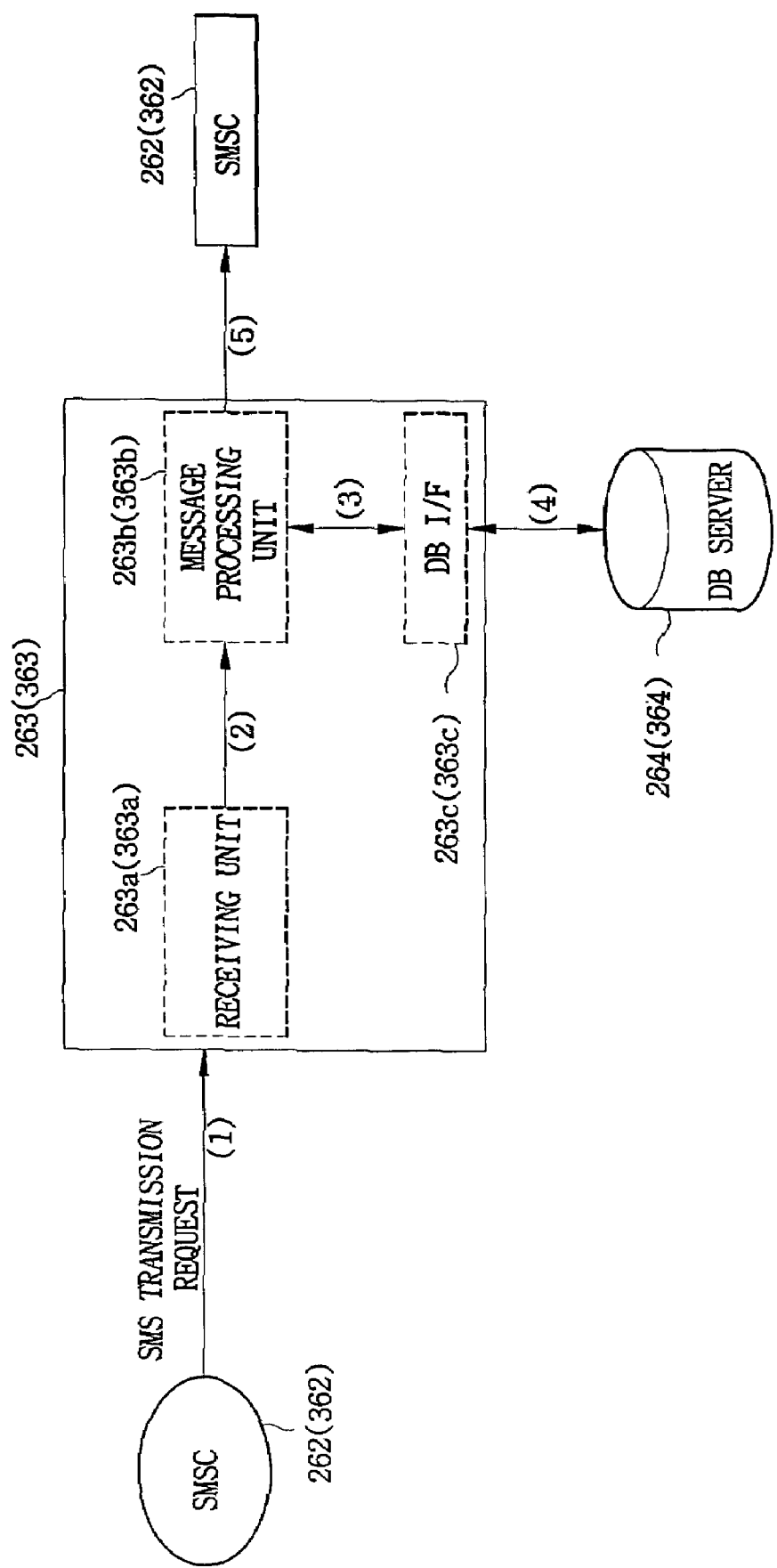
FIG. 4 is a detailed block diagram of the message transmission processor of FIG. 3.

FIG. 3 is a detailed block diagram of the SMS server in FIG. 2, and FIG. 4 is a detailed block diagram of the message transmission processor of FIG. 3.

As shown in FIG. 3, the SMS server 260 or 360 can comprise a web server 261 or 361, an SMS Center (SMSC) 262 or 362, a message transmission processor 263 or 363, a DB server 264 or 364, a subscriber information synchronization unit 265 or 365, and a database 266 or 366.

The subscriber information synchronization unit 265 or 365 synchronizes user terminal registration information to the HLR 230 or 330 by periodically reading the user terminal registration information registered in the HLR 230 or 330 and updating the database 266 or 366 managed by the SMS server 260 or 360 via the DB server 264 or 364.

That is, because the registration information of an existing mobile user terminal has been managed as a file DB on the memory, approximately 250 Mbytes of the memory was used for one inquiry, thereby generating an overload of the system resources. Furthermore, a phenomenon of operation speed degradation of the system arises. Thus, the database 266 or 366 is also configured for being managed as a commercial database so that access time becomes short and memory usage amount is significantly reduced.

The SMSC 262 or 362 is a module for receiving an SMS message to be sent and for sending it over the IP network to the pBSC of a private wireless network system in another zone where an associated destination terminal is positioned, in which all transmission flows upon message transmission to the home network is implemented.

Furthermore, the SMSC 262 or 362 queries position information and terminal information of the SMS message receiving terminal stored in the database 266 or 366, and sends the SMS message over the IP network to an IP address of the pBSC of a private wireless network system corresponding to the position information of the associated terminal.

The SMSC 262 or 362 receives an acknowledgment message for the result of the SMS message transmission and updates the SMS message originating/receiving information.

If there is an SMS message transmission processing request signal from the SMSC 262 or 362, the message transmission processor 263 or 363 forms an associated SMS message transmission data format, and retrieves the database via the DB server 264 or 364 to identify the position information of an associated SMS message receiving terminal.

After the processor identifies the position information of the associated terminal, when the associated terminal is positioned in a service area of a private wireless network system in another zone, the processor confirms an IP address of the pBSC of the associated private wireless network system and provides the associated IP address information and the formed SMS message data format for the SMSC 262 or 362, thereby being sent over the IP network to the pBSC of the private wireless network system corresponding to the associated IP address.

A configuration of the above-noted message transmission processor 263 or 363 is described in detail below with reference to FIG. 4.

As shown in FIG. 4, the message transmission processor 263 or 363 comprises a receiving unit 263*a* or 363*a*, a message processing unit 263*b* or 363*b*, and a DB interface 263*c* or 363*c*.

If there is an SMS message transmission request from the SMSC 262 or 362, the receiving unit 263*a* or 363*a* receives the request via one of a plurality of sockets and provides an associated signal for the message processing unit 263*b* or 363*b*.

The message processing unit 263*b* or 363*b* forms a transmission data format for an SMS message in response to the SMS message transmission request received via the receiving unit 263*a* or 363*a*, stores the formed SMS transmission data format in a message queue temporarily, and provides DB server 264 or 364 with the position information acknowledgment request signal of the SMS receiving terminal for the via the DB interface 263*c* or 363*c*.

In addition, if the message processing unit 263*b* or 363*b* receives the position information of the SMS message receiving terminal and pBSC IP address information of the private wireless network system corresponding to the associated position from the DB server 264 or 364, then it sends the SMS message stored in the message queue and the pBSC IP address information of the associated private wireless network system to the SMSC 262 or 362. Accordingly, the SMSC 262 or 362 sends the SMS message transferred from the message processing unit 263*b* or 363*b* to the IP address of the pBSC of the associated private wireless network system over the IP network.

Roaming service between the private wireless network systems in the multi-zone arrangement having such a configuration and an SMS operation through the roaming service according to an embodiment of the present invention is described in detail below with reference to the accompanying drawings.

First, in order to perform the roaming and SMS services between respective private wireless network systems, synchronization must occur first upon system initialization (setup) with respect to subscriber information stored in the HLR of each system. A method of synchronizing subscriber information upon the system initialization is described below.

FIG. 5 is a view of database structures of an HLR and a VLR for each system.

As shown in FIG. 5, registration information of terminals of a private wireless switching system according to an embodiment of the present invention is configured and operated in a different manner from that of a public network system.

An HLR database is configured within a private Base Station Manager (pBSM) managing the private wireless network system and a VLR database is configured within the pBSC, such that the HLR and VLR are always synchronized so as to have the same information.

Accordingly, the wireless terminal will periodically load and transmit terminal information (i.e., Mobile ID Number (MIN), Electronic Serial Number (ESN), International Mobile-Subscriber Identity (IMSI), etc.) on a position registration message. Paging system IDs that are present in the VLR and HLR databases are updated based on this terminal information, and it makes it possible to determine whether or not the terminal is currently positioned in the service area of the private wireless network system.

In HLR and VLR database structures shown in FIG. 5, MS_Tel is home number information of the wireless terminal, MS_Min is wireless terminal number information, Cos is service grade information for each subscriber, Tenant is number information of a virtual switch system, org_hlr_id is a Call Manager (CM) ID with which a first private wireless network system user is registered, MCC_MNC_LEN is a system code, MCC_MNC_0 is a country code, and PageSYSID is CM ID information on which a position registration raises, wherein previous information and current information are compared to each other to update an associated information when a position change occurs.

For example, as shown in FIG. 2, if the terminal A1, registered in the InfoMobile Zone 1, moves from zone 1 to zone 2 (InfoMobile Zone 2), the terminal loads and sends its own information (i.e., MIN, ESN, IMSI, . . . ) to the BTS 310 positioned in zone 2 through a system parameter message (registration message).

The BTS 310 of zone 2 that receives this information sends it to the pBSC 320, and the pBSC 320 retrieves a DB using the received MIN (or ESN, IMSI) information of the terminal to determine that the terminal has moved when CM ID with which this terminal is registered and CM ID of a service area in which the terminal is currently positioned are different from each other, and to thereby update the information in the VLR and the HLR.

Further, since the wireless terminal sends its own information when originating a message or paging a response message, the pBSC 320 will update the position registration information of the terminal using this information.

In order to perform the roaming service according to an embodiment of the present invention, it is necessary to synchronize subscriber information between the HLRs 230 and 330 and the VLRs of the respective private wireless network systems 200 and 300. Three types of synchronization are possible.

Firstly, synchronization is performed upon initial setup of each private wireless network system; secondly, synchronization is performed upon subscriber information addition/alteration/deletion via a User Interface (UI); and thirdly, HLR and VLR information synchronization of each private wireless network system is performed upon movement to another service area subscriber to modify state information through a call request.

Figure 6:
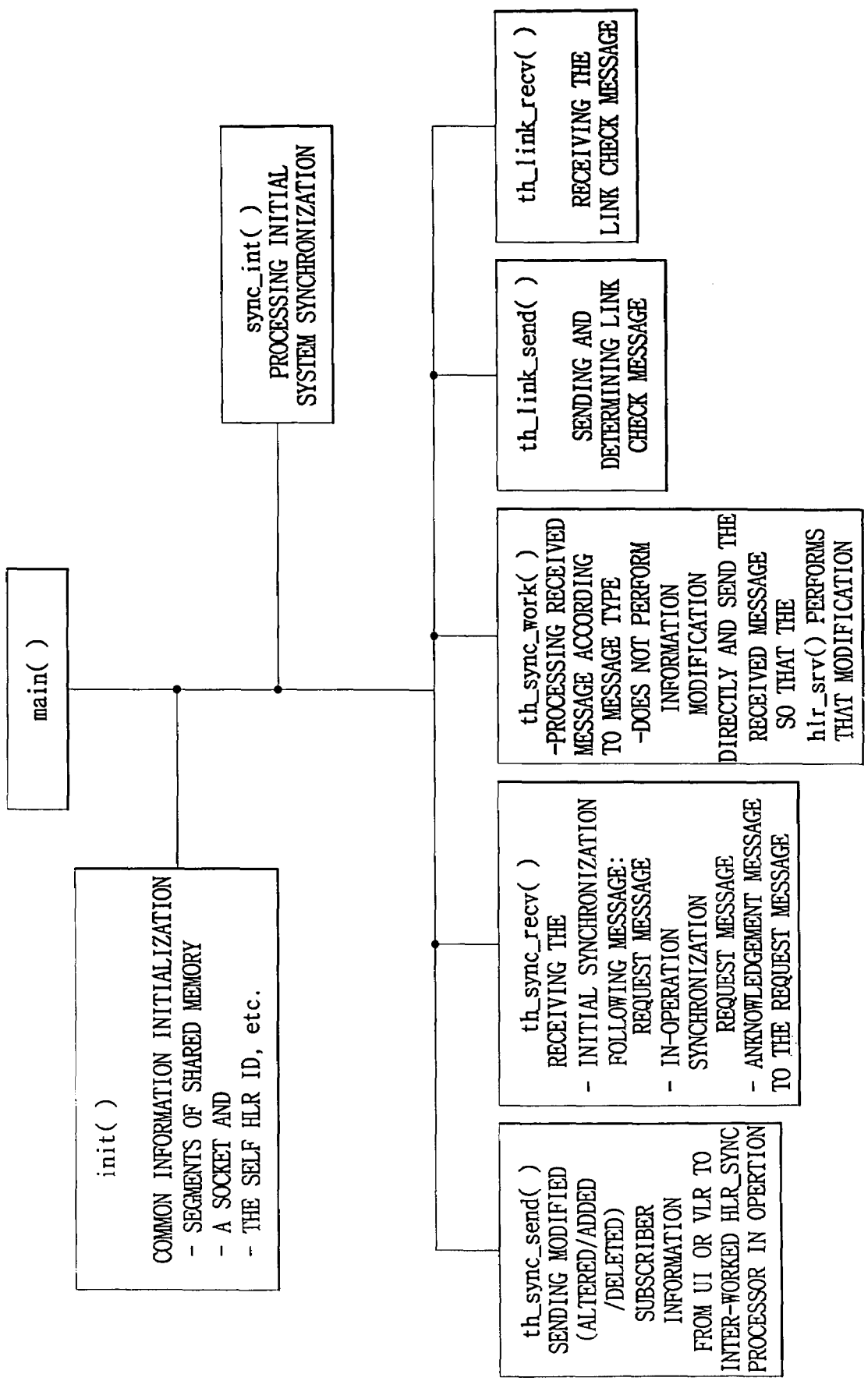
FIG. 6 is a view of a configuration of an HLR synchronization processor according to an embodiment of the present invention.

A discussion of a processor for performing such an HLR synchronization process follows with reference to FIG. 6.

FIG. 6 is a view of a configuration of an HLR synchronization processor.

As shown in FIG. 6, threads making up the HLR synchronization processor can comprise init( ), sync_init( ), th_sync_send( ), th_sync_recv( ), th_sync_work ( ), thlink_send( ), and th_link_recv( ).

The init( ) thread, which is for initializing a system, initializes common information of respective private wireless network systems, initializes shared memory segments, and initializes the socket and its own HLR ID.

The sync_init( ) thread, which is for performing subscriber information synchronization in HLRs upon initial system setup, sends a plurality of subscriber information stored in its own HLR database to HLRs of private wireless network systems positioned in a plurality of zones over the IP network.

The th_sync_send( ) thread is responsible for sending altered/added/deleted subscriber information to a th_sync_recv( ) thread of an HLR of an inter-worked private wireless network system in another zone over the IP network, when alteration/addition/deletion of subscriber information occurs via a UI or a VLR during operating the system.

The th_sync_recv( ) thread serves to receive an initial synchronization request message, an in-operation synchronization request message, an acknowledgment message to the synchronization request message, and subscriber information (including subscriber information upon initialization and synchronization, and subscriber information modified during operation), which are transferred from the th_sync_send( ) thread of the HLR of the private wireless network system in another zone.

The th_sync_work( ) thread processes the message received via the th_sync_recv( ) thread according to the type of message, and send the received message such that the hlr_srv( ) performs that modification rather than directly perform subscriber information modification.

The th_link_send( ) thread determines a state of the message transmission and the link for sending a message to check the link between the private wireless network systems positioned in respective zones, for the sake of initial system setup synchronization and subscriber information synchronization upon subscriber information alteration/deletion/addition.

The th_link_recv( ) thread is a thread for receiving the link check message sent from the th_link_send( ) thread within the HLR of the inter-worked private wireless network system in another zone.

A detailed operation of respective threads for performing such synchronization processes will be described in detail with reference to the accompanying drawings.

Figure 7:
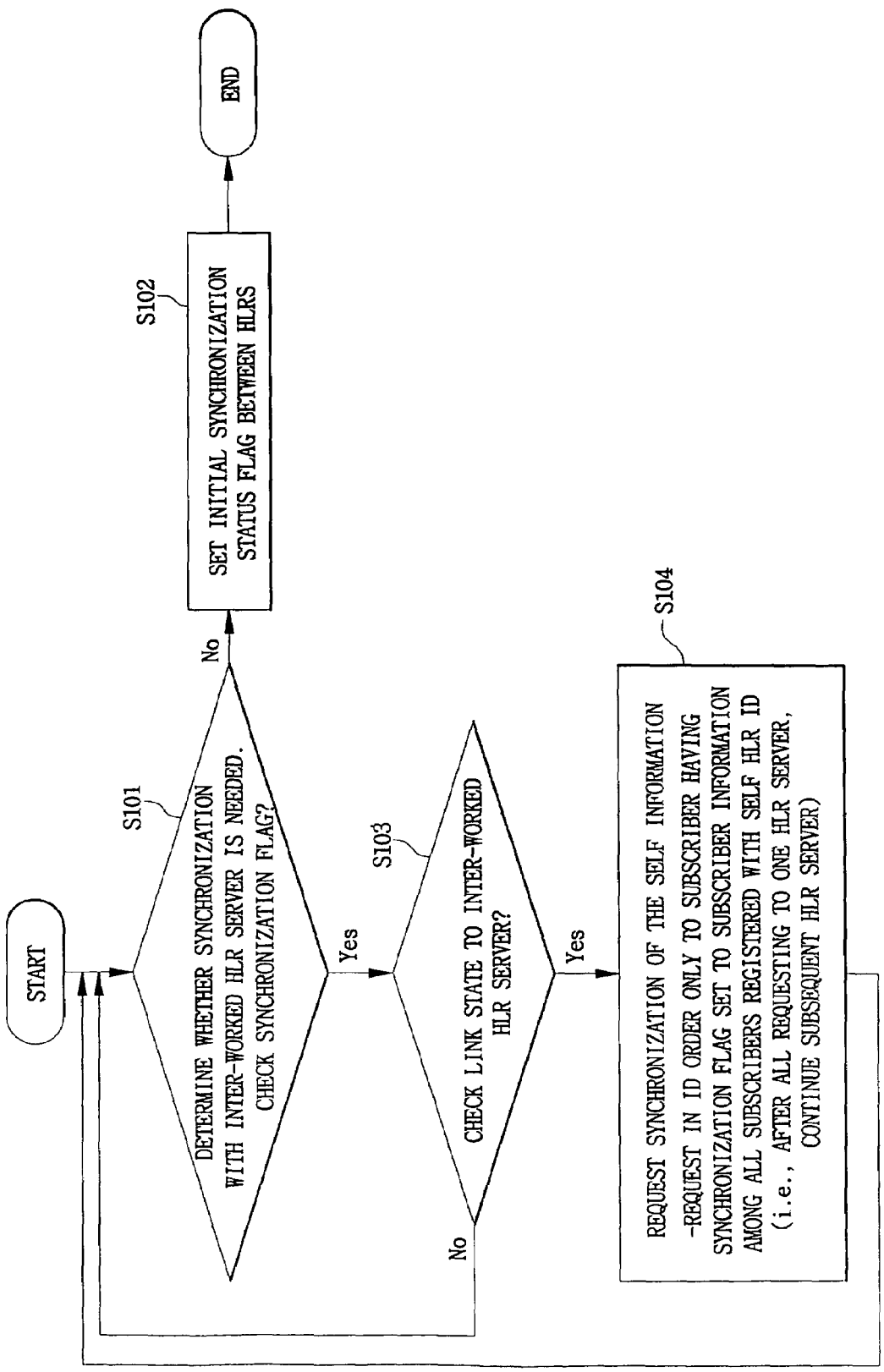
FIG. 7 is a flowchart of the sync_init( ) thread of the HLR processor of FIG. 6.

FIG. 7 is a flowchart of the sync_init( ) thread of FIG. 6.

As shown in FIG. 7, a determination is made as to whether synchronization with the HLR of the interfaced private wireless network system is needed upon initial system setup. That is, a determination is made as to whether a flag check for initial synchronization is needed (S101).

If the synchronization flag check is not needed, that is, if the initial synchronization flag check has been already completed, the flag for initial synchronization state between the HLRs is set (S102).

Otherwise, if the synchronization flag check is needed, a link state to the interfaced HLR is checked to determine whether an abnormality exists in the link state (S103). That is, a link check message is sent through the above-stated th_link_send( ) thread to the th_link_recv( ) thread of an HLR of an interfaced private wireless network system in another zone to check the link state based on an acknowledgment signal as responded.

If there is no abnormality in the link state with the interfaced HLR, synchronization of its own subscriber information is requested to the interfaced HLR. The synchronization is requested in an ID order only to a subscriber having a synchronization flag set to the subscriber information among all subscribers registered with its own HLR ID. After synchronization information has been requested to an HLR of one private wireless network system, the synchronization information is sequentially requested to HLRs of other interfaced private wireless network systems (S104).

That is, the sync_init( ) thread is performed only once upon running the HLR synchronization process as shown in FIG. 7, and only after this process is completed, can other threads be performed.

Furthermore, addition/deletion/alteration of the subscriber information via a UI is impossible during the sync_init( ) thread operation, and an acknowledgment process of the subscriber information requested to the interfaced HLR for the purpose of synchronization is performed in th_sync_recv( ) thread. This operation is described below.

Thus, an operation of the th_sync_send( ) thread, which is for performing the synchronization process on added/deleted/altered subscriber information via the UI after the initial synchronization, is described below.

Figure 8:
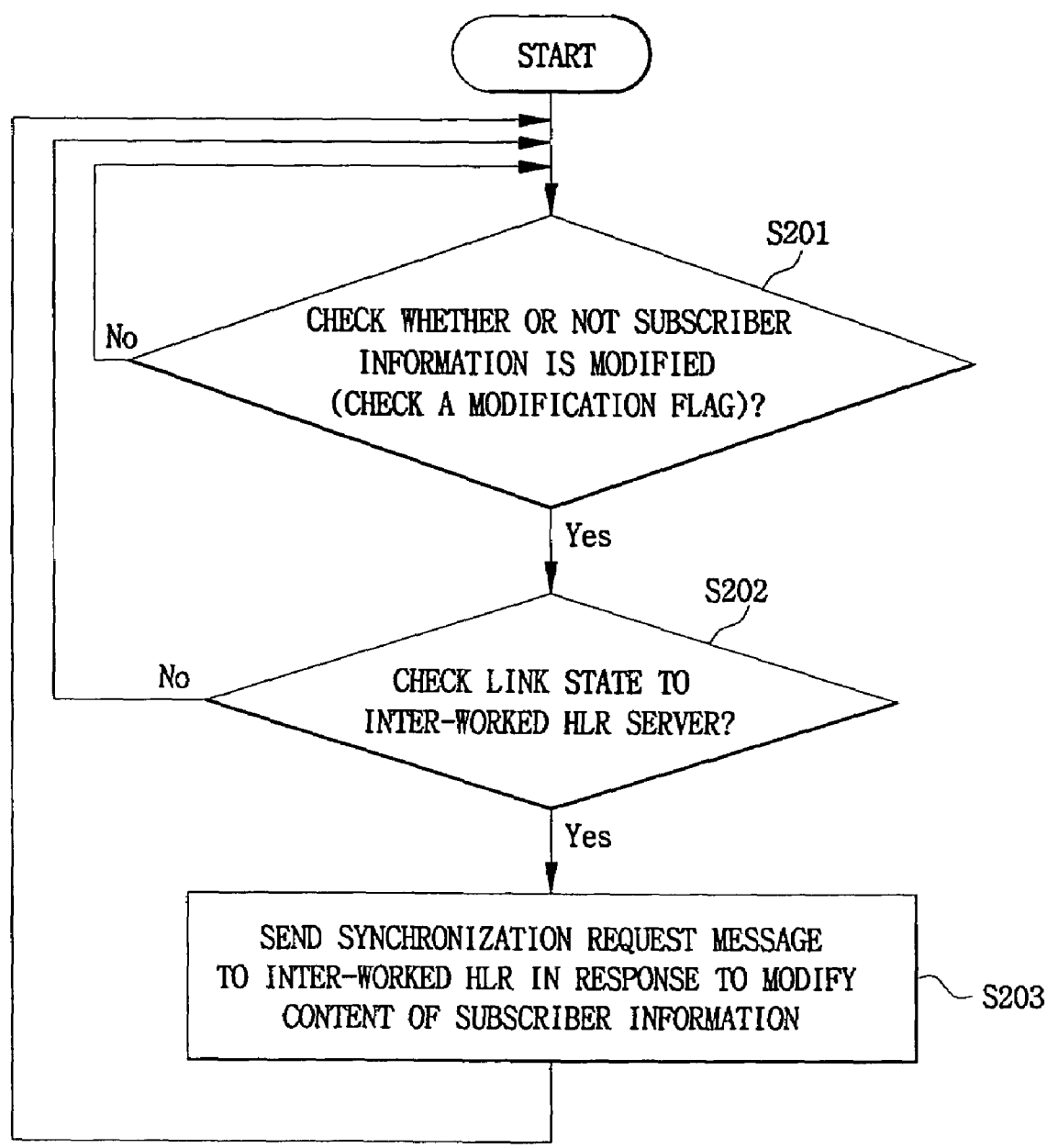
FIG. 8 is a flowchart of th_sync_send( ) thread of an HLR synchronization processor according to the present invention.

FIG. 8 is a flowchart for the th_sync_send( ) thread of an HLR synchronization processor according to an embodiment of the present invention.

As shown in FIG. 8, a modification flag is checked with respect to the subscriber information to determine whether or not the subscriber information has been modified (S201). That is, a determination is made as to whether alteration, deletion and addition or the like of the subscriber information via the UI has been requested.

If the alteration, addition, deletion or the like of the subscriber information via the UI has been requested, the link state with the interfaced HLR is checked (S202). The link state check to the interfaced HLR is conducted through the th_link_send( ) thread.

As a result of the link check, when the link state to the interfaced HLR is good, a synchronization request message is sent to the interfaced HLR in response to the modified content of the subscriber information (S203). The altered/added/deleted subscriber information, requested from the UI, is included in the transferred synchronization request message.

Consequently, the th_sync_send( ) thread is a thread for performing the synchronization process on the added/deleted/altered subscriber information after the initial synchronization has been completed, and continues the synchronization by periodically checking the modification flag with respect to the entire subscriber information. An acknowledgment process of the interfaced HLR synchronization request is conducted by the th_sync_recv( ) thread.

An operation of the th_sync_recv( ) thread is described below with reference to FIG. 9.

Figure 9:
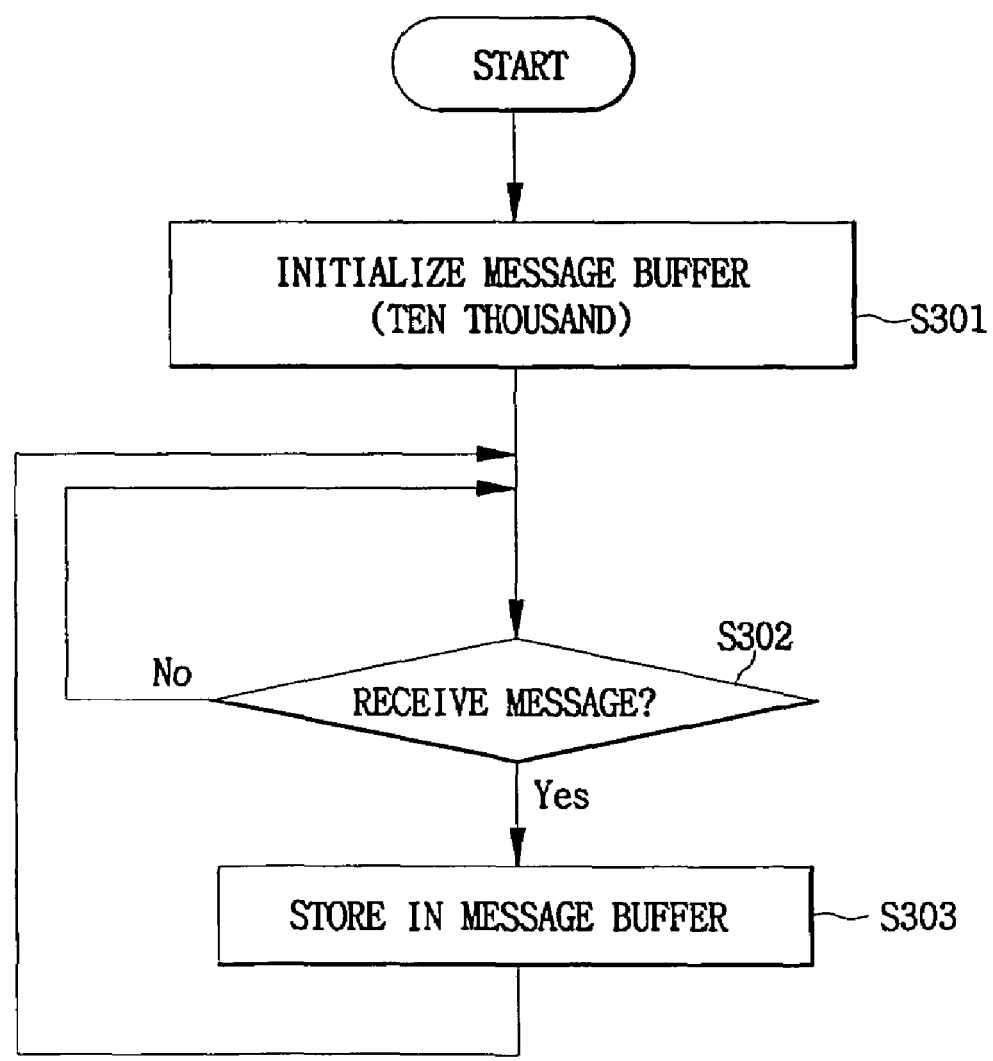
FIG. 9 is a flowchart of th_sync_recv( ) thread of an HLR synchronization process according to an embodiment of the present invention.

FIG. 9 is a flowchart of the th_sync_recv( ) thread for the HLR synchronization process according to an embodiment of the present invention.

As shown in FIG. 9, a message buffer is first initialized (S301).

When the message buffer has been initialized, a determination is made as to whether or not a synchronization message has been received, which is transferred from a sync_init( ) thread and a th_sync_send( ) thread of the HLR of the interfaced private wireless network system with respect to a synchronization message requested by the sync_init( ) thread and the th_sync_send( ) thread of the HLR to which the th_sync_recv( ) thread belongs (S302).

If a determination has been made that the synchronization message transferred from the sync_init( ) thread and the th_sync_send( ) thread of the HLR of the interfaced private wireless network system has been received, the received synchronization message is stored in the initialized message buffer (S303). That is, the synchronization message is sequentially stored in the message buffer in order to prevent message loss while processing the received message. Practical synchronization is processed by the th_sync_work( ) thread.

Then, a synchronization operation in the th_sync_work( ) thread is described below with reference to FIG. 10, in which a subscriber information synchronizing process is performed between the HLRs of the interfaced private wireless network systems in the multi-zone arrangement using the synchronization message stored in the message buffer through the th_sync_recv( ) thread.

Figure 10:
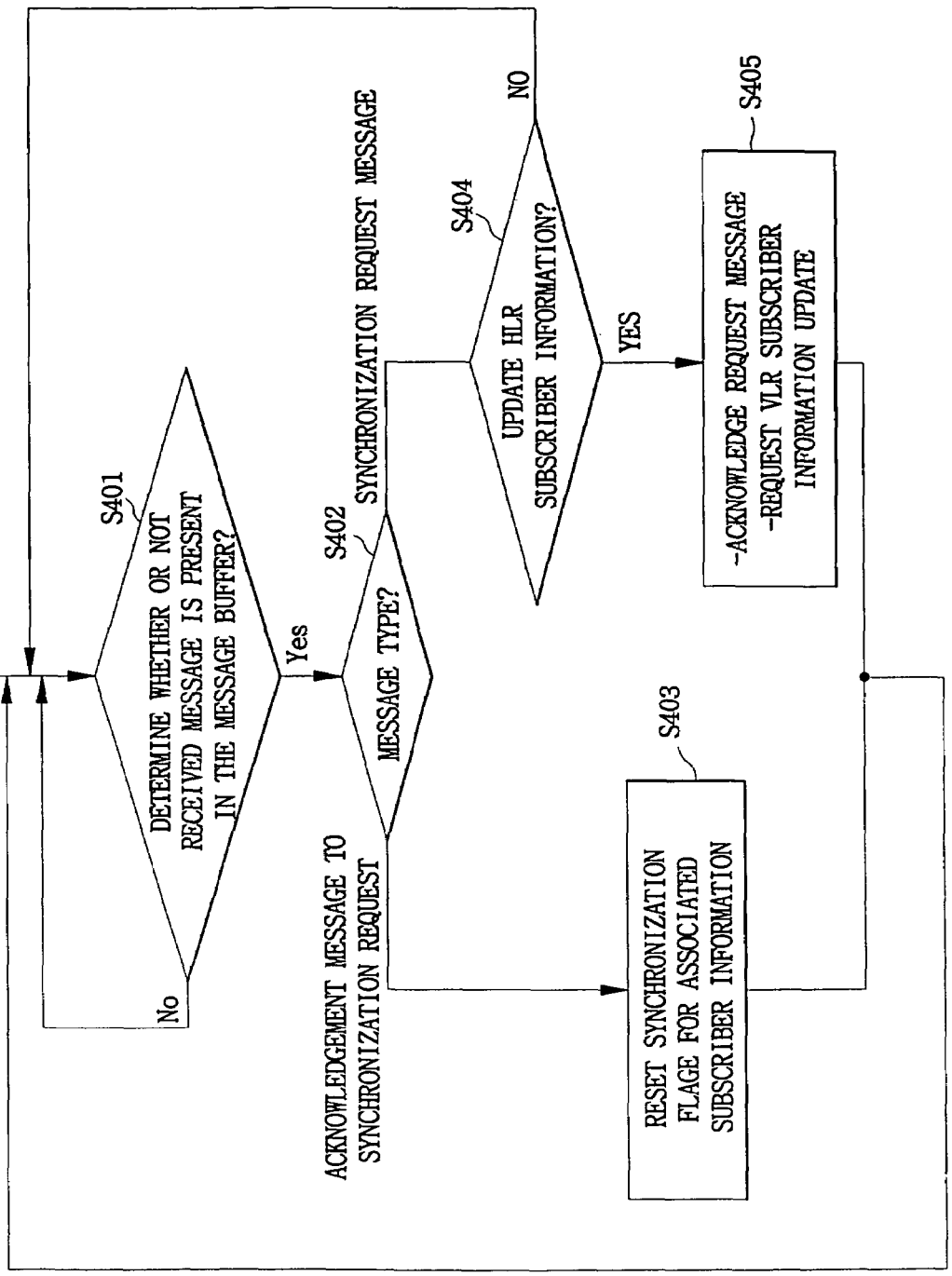
FIG. 10 is a flowchart of th_sync_work( ) thread of an HLR synchronization process according to an embodiment of the present invention.

FIG. 10 is a flowchart of the th_sync_work( ) thread in an HLR synchronization process in accordance with an embodiment of the present invention.

As shown in FIG. 10, a determination is first made as to whether the synchronization message has been received and stored in the message buffer through the th_sync_recv( ) thread (S401).

If it has been determined that the synchronization message has been received and stored in the message buffer, the type of received message is determined (S402).

If it has been determined that the type of message stored in the message buffer is an acknowledgment message to the synchronization request, a synchronization flag for an associated subscriber information is reset depending on the received message (S403). That is, when the type of the message is the acknowledgment message to the synchronization message, which has been requested from the sync_init( ) or the th_sync_send( ) thread of the HLR synchronization processor to which it belongs, the synchronization flag for the associated subscriber information for performing the synchronization is reset and the synchronization flag check of the associated subscriber is thereby completed.

However, in step S402, when the type of the message stored in the message buffer is a synchronization request message which is transferred from the sync_init( ) or th_sync_send( ) thread of an HLR synchronization processor of one interfaced private wireless network system in the multi-zone arrangement, the received synchronization message is checked to determine whether the message is a synchronization message indicating that an update of the HLR subscriber information should be conducted (S404).

If the synchronization request message is one indicating that an update is needed, a synchronization request acknowledgment message responsive to the synchronization request message is transferred to the th_sync_recv( ) thread of the HLR synchronization processor of a correspondent private wireless network system which has transferred the synchronization request message, and the subscriber information in the HLR corresponding to the received synchronization request message is modified. Furthermore, when the subscriber information in the HLR is completely modified, a subscriber information modification is requested to the VLR in the pBSC of the private wireless network system to which it belongs, such that synchronization between the HLR and VLR is performed (S405).

Figure 11:
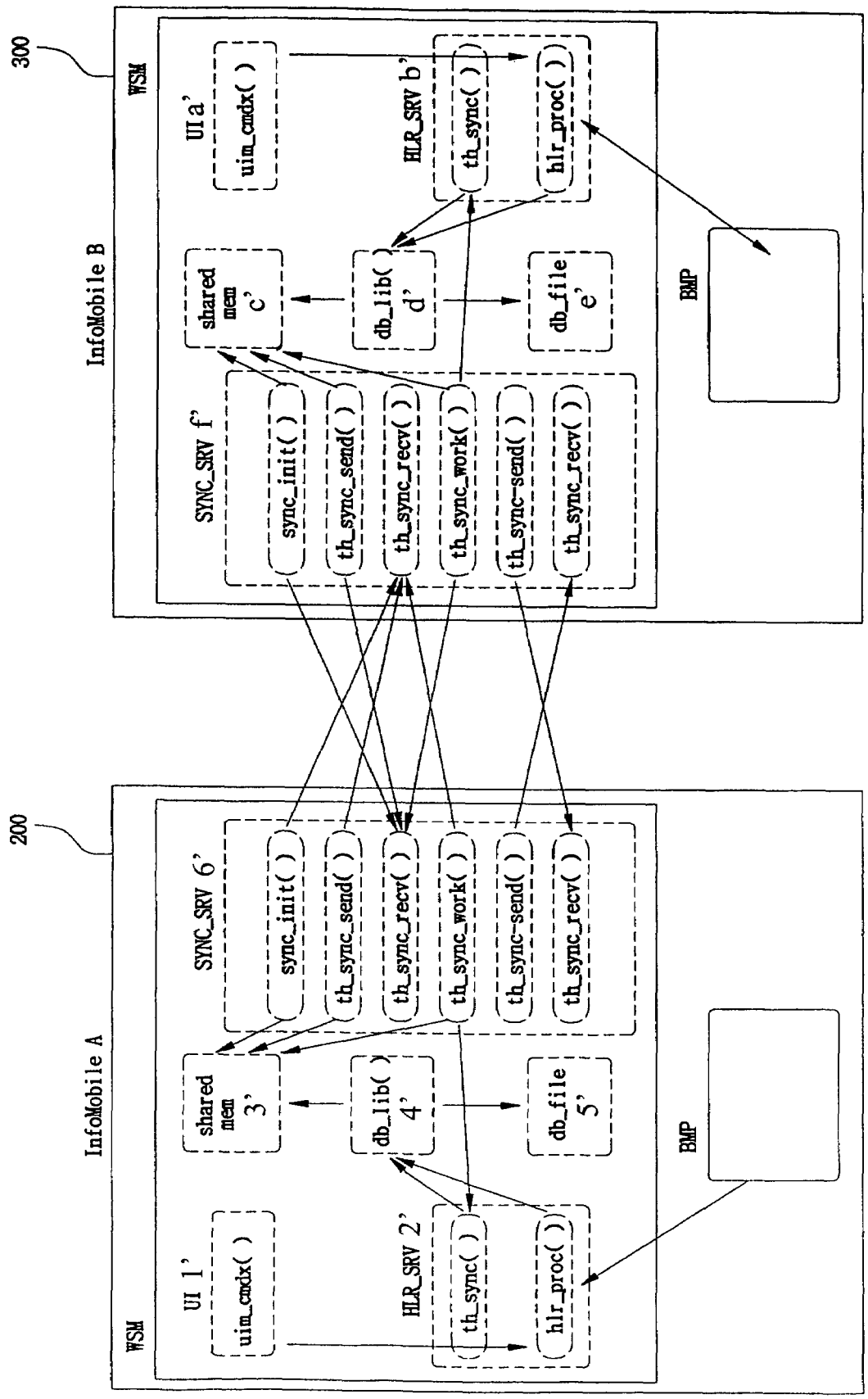
FIG. 11 is a view of a synchronization flow between HLR processors for roaming service between private wireless network systems in a multi-zone arrangement according to an embodiment of the present invention.

Hereinafter, a signal flow of performing processes for initial synchronization, synchronization upon modification of the subscriber information from the UI, and synchronization upon position registration modification of the wireless terminal device using the respective threads of the HLR synchronization processor as stated above will be described in steps with reference to FIGS. 11 to 14. At this time, respective private wireless network systems in the multi-zone arrangement described above are indicated by InfoMobile A, B, . . . , for the sake of easy understanding and notation in describing the flow of each of the synchronization processes. A WSM shown in FIG. 11 is a device for managing a call of each InfoMobile A, B, . . . , which comprises HLRs 230 and 330 in the multi-zone arrangement private wireless network system, that is, InfoMobile A, B, . . . (200, 300, . . . ), in respective zones as shown in FIG. 2.

FIG. 11 is a view of a synchronization flow for roaming service between private wireless network systems according to an embodiment of the present invention. Message transmission and reception between the InfoMobile A and the InfoMobile B is performed over the IP network.

As shown in FIG. 11, a flow upon the initial synchronization is as follows. If an initial synchronization request message is transferred through the sync_init( ) thread of a synchronization processor SYNC_SRV 6' of the InfoMobile A 200 to a synchronization processor SYNC_SRV f' of the InfoMobile B over the IP network, then it is received by a th_sync_recv( ) thread of the synchronization processor SYNC_SRV f' of the InfoMobile B.

The th_sync_recv( ) thread, which has received the initial synchronization request message, temporarily stores the received initial synchronization request message in the message buffer. The th_sync_work( ) thread of the synchronization processor SYNC_SRV f' of the InfoMobile B updates InfoMobile A subscriber information according to the temporarily stored synchronization request message, and then, sends an acknowledgment message depending on the synchronization to the synchronization processor SYNC_SRV 6' of the InfoMobile A 200 over the IP network.

The th_sync_recv( ) thread of the synchronization processor SYNC_SRV 6' of the InfoMobile A 200 receives the acknowledgment message sent from the th_sync_work thread of the synchronization processor SYNC_SRV f' of the InfoMobile B to temporarily store it in the message buffer. The th_sync_work thread of the synchronization processor SYNC_SRV 6' of the InfoMobile A 200 resets an initial synchronization flag for the associated subscriber information in the shared mem( ) 3' and db_file( ) 5' depending on the acknowledgment message stored in the message buffer.

Meanwhile, the th_sync_work( ) thread of the synchronization processor SYNC_SRV f' of the InfoMobile B sequentially reads the synchronization request message stored in the message buffer through the th_sync_recv( ) thread (including a plurality of subscriber information registered in the InfoMobile A) to provide it for the th_sync( ) thread of the HLR_SVR b'. Then, the th_sync thread of the HLR_SVR b' updates HLR subscriber information stored in shared mem( ) c' and db_file( ) e' through the database library db_lib( ) d' with the subscriber information provided from the th_sync_work thread.

A flow of this initial system synchronization is described below with reference to the flowchart of FIG. 12.

Figure 12:
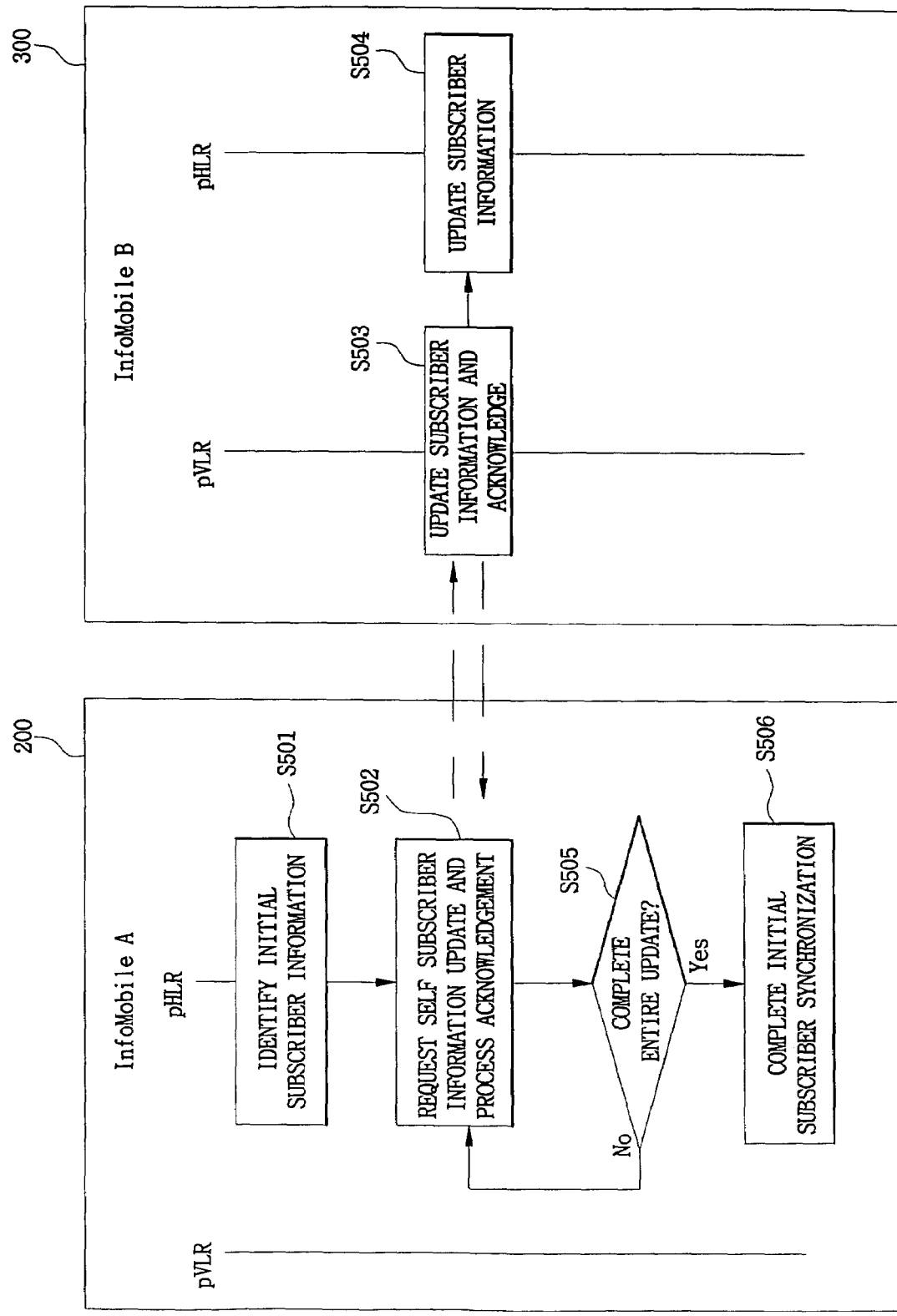
FIG. 12 is a flowchart of an initial system synchronization operation between HLRs of private wireless network systems in a multi-zone arrangement according to an embodiment of the present invention.

FIG. 12 is a flowchart for a system's initial synchronization operation between pHLRs of the interfaced private wireless network systems.

As shown in FIG. 12, initially, given that respective wireless terminal subscribers are registered in the InfoMobile systems in respective zones, if the synchronization is requested from the InfoMobile A 200 to the InfoMobile B 300, the pHLR of the InfoMobile A 200 first identifies initial subscriber information as initially registered (S501).

Also, an initial synchronization request message, which comprises subscriber information for updating the subscriber information registered in the pHLR of the InfoMobile A, is transferred to the pHLR of the InfoMobile B 300 over the IP network (S502).

The pHLR of the InfoMobile B 300 updates its own database with the subscriber information, which is included in the initial synchronization message transferred from the pHLR of the InfoMobile A 200, and sends an acknowledgment message in response to the synchronization request message to the InfoMobile A 200. Furthermore, the pHLR of the InfoMobile B 300 provides the pVLR in the pBSC with the subscriber information updated for the sake of subscriber information synchronization after updating its own subscriber information, such that the subscriber information in the pHLR is updated (S504).

The pHLR of the InfoMobile A 200 resets an associated subscriber information synchronization flag depending on the acknowledgment message transferred from the pHLR of the InfoMobile B 300 (S502).

Subsequently, the pHLR of the InfoMobile A 200 determines whether updating all the subscriber information has been completed (S505). If the update (synchronization) of all the subscriber information has been completed, synchronization of the system's initial subscriber information has been completed (S506).

A synchronization flow where subscriber information modification (addition/deletion/alteration) from a UI takes place is described below with reference to FIG. 11.

First, if subscriber modification occurs through a uim_cdmx( ) thread of a UI 1' of the InfoMobile A 200, the modified subscriber information is provided for a hlr_proc( ) thread of an HLR server HLR_SVR 2'.

The hlr_proc thread provides the modified subscriber information inputted from the UI 1' for the db_lib( ) 4' thread to modify associated subscriber information in the shared memo ( ) 3' and the db_file( ) 5'.

When the modification of the associated subscriber information has been completed, the th_sync_send( ) thread of the SYNC_SVR 6' of the InfoMobile A 200 transfers a synchronization request message, including the modified subscriber information, to the SYNC_SRV f' of the InfoMobile B 300 over the IP network. The transferred synchronization request message for the modified subscriber information is received through the th_sync_recv( ) thread of SYNC_SRV f' of the InfoMobile B.

The th_sync_recv thread of the SYNC_SRV f', which has received the synchronization request message for the modified subscriber information, temporarily stores the received synchronization request message for the modified subscriber information in the message buffer. The th_sync_work( ) thread of the SYNC_SRV f' of the InfoMobile B 300 updates the subscriber information depending on the temporarily stored synchronization request message and, thereafter, sends an acknowledgment message depending on the synchronization to the SYNC_SRV 6' of the InfoMobile A 200 over the IP network.

The th_sync_recv thread of the synchronization processor SYNC_SRV 6' of the InfoMobile A 200 receives the acknowledgment message sent from the th_sync_work thread of the synchronization processor SYNC_SRV f' of the InfoMobile B, and temporarily stores it in the message buffer. The th_sync_work thread of the synchronization processor SYNC_SRV 6' of the InfoMobile A 200 resets an modification synchronization flag for an associated subscriber information in the shared mem( ) 3' and db_file( ) 5' depending on the acknowledgment message stored in the message buffer.

The th_sync_work( ) thread of the SYNC_SRV f' of the InfoMobile B 300 sequentially reads the synchronization request message for the modified subscriber information stored in the message buffer through the th_sync_recv thread and provides it to the th_sync thread of the HLR_SVR b'. Then, the th_sync( ) thread of the HLR_SVR b' updates the associated HLR subscriber information stored in the shared memo c' and db_file( ) e' through the database library db_lib( ) d' with the modified subscriber information provided from the th_sync_work( ) thread.

Given that such subscriber information modification via the UI has been made, synchronizing the subscriber information is permitted after the initial system synchronization process has been completed.

A flow of synchronizing the modified subscriber information when there is such modification of subscriber information from the UI is described below with reference to the flowchart of FIG. 13.

Figure 13:
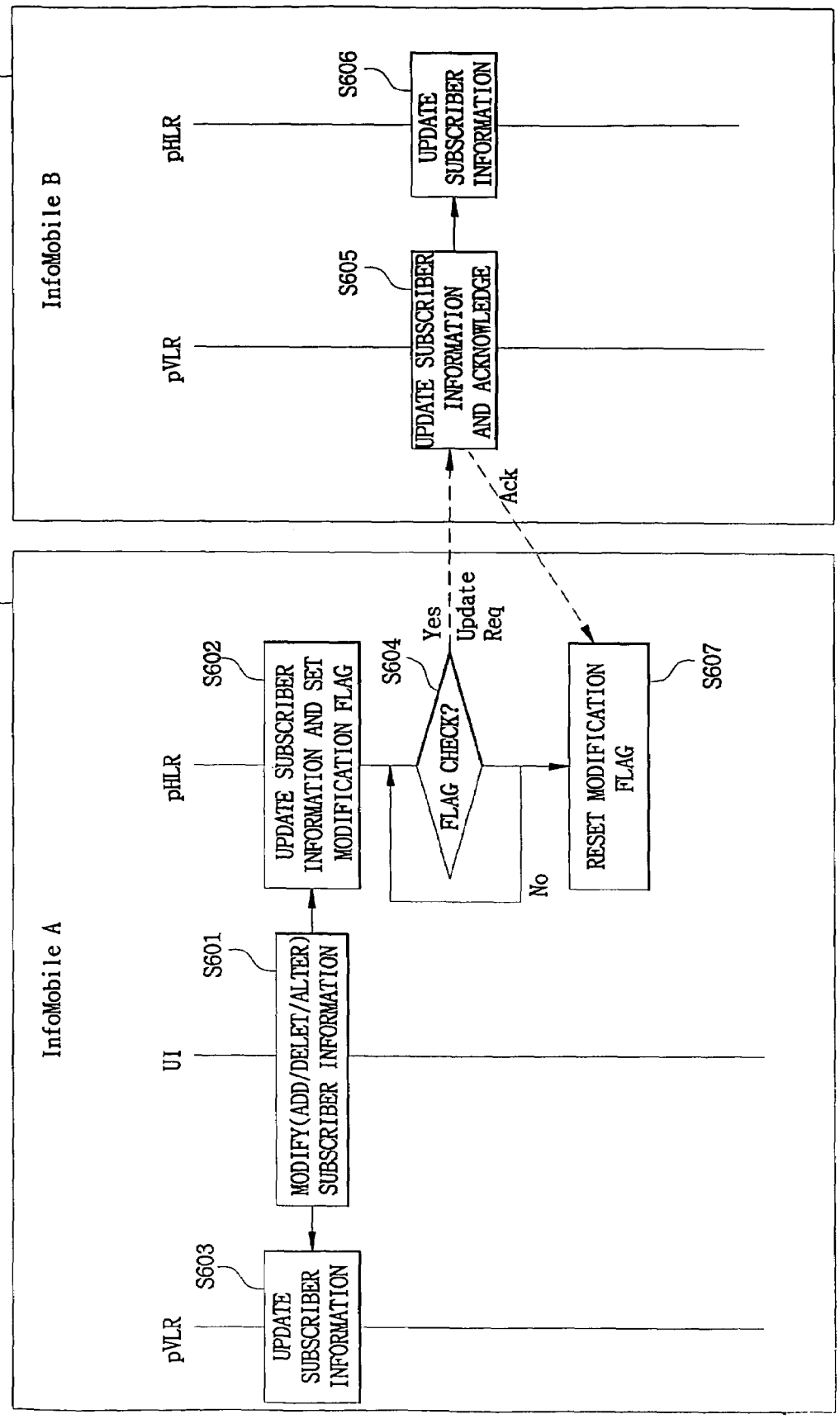
FIG. 13 is a flowchart of a synchronization operation of modified subscriber information between HLRs of private wireless network systems in a multi-zone arrangement according to an embodiment of the present invention.

FIG. 13 is a flowchart for an operation of synchronizing the modified subscriber information between pHLRs of interfaced private wireless network systems.

As shown in FIG. 13, if modification (alteration/deletion/addition) of the subscriber information from the UI of the InfoMobile A 200 (S601) exists, then the modified subscriber information updates associated subscriber information in the pHLR of the InfoMobile A 200 and the pVLR of the pBSC(S602 and S603) respectively.

Subsequently, the pHLR of the InfoMobile A 200 checks a modification synchronization flag for the subscriber information in the database and sends a synchronization request message for updating the modified subscriber information over the IP network, to the pHLR of the interfaced InfoMobile B 300 (S604).

The pHLR of the InfoMobile B 300 updates the associated subscriber information in its own database depending on the synchronization request message for the modified subscriber information sent from the pHLR of the InfoMobile A 200, and sends an acknowledgment message in response to the synchronization request message, to the InfoMobile A 200 (S605). Furthermore, after updating its own subscriber information, the pHLR of the InfoMobile B 300 provides the updated subscriber information to synchronize the subscriber information for the is pVLR in the pBSC, so that the subscriber information is updated (S606).

The pHLR of the InfoMobile A 200 resets a modification flag for the associated subscriber information depending on the acknowledgment message sent from the pHLR of the InfoMobile B 300 (S607).

Since a flow of synchronizing subscriber information of the moved wireless terminal is the same as the synchronization flow upon modification of the above-stated subscriber information as shown in the table of FIG. 11 when the mobile terminal moves from a service area of an InfoMobile system to which it has been registered to the service area of an InfoMobile system in another zone, a detailed explanation thereof has been omitted. It is described below by way of the flowchart of FIG. 14.

Figure 14:
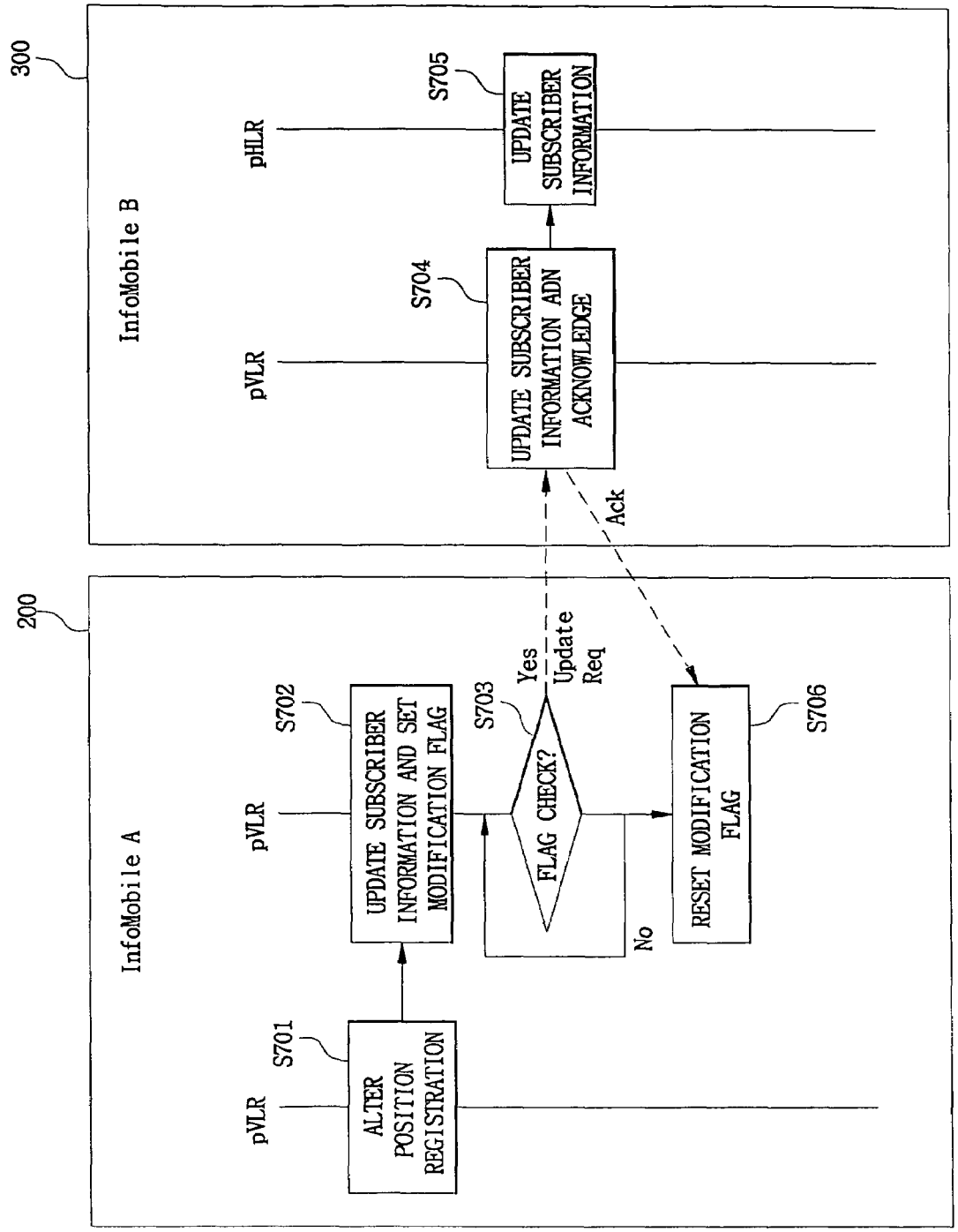
FIG. 14 is a flowchart of a subscriber information synchronization operation between an HLR of the system in which a wireless terminal is positioned and an HLR of the inter-worked system in another zone when the wireless terminal moves from a service area of the private wireless network system, in which it has registered, to a service area of a private wireless network system in another zone.

FIG. 14 is a flowchart for an operation of synchronizing subscriber information between a pHLR of an InfoMobile system where the wireless terminal is positioned and a pHLR of an inter-worked InfoMobile system in another zone, wherein the wireless terminal has moved out of a service area of an InfoMobile system in which the wireless terminal has been registered into the service area of the InfoMobile system in another zone.

If a wireless terminal registered in an InfoMobile B 300 moves into the service area of an InfoMobile A 200, it sends its own position registration message to the pBSC via the BTS of the InfoMobile A 200 in order to request a call to the InfoMobile A 200.

The pBSC of the InfoMobile A 200 alters registration of position information of an associated terminal stored in a pVLR of the pBSC based on the received position registration message of the wireless terminal (S701) and, thereafter, provides the pHLR with the subscriber information of the wireless terminal of which the position information has been altered, in order to update the associated subscriber information. In response thereto, the pHLR updates the associated subscriber information depending on the altered subscriber information provided from the pBSC (pVLR), and sets the modification flag for the associated subscriber information (S702).

The pHLR of the InfoMobile A 200 checks the modification flag for the subscriber information and transfers a synchronization request message to the pHLR of the inter-worked InfoMobile B 300 over the IP network to update the subscriber information of which the position information has been altered (S703).

The pHLR of the InfoMobile B 300 updates the associated subscriber information in its own database depending on the synchronization message for the altered subscriber information of the wireless terminal, which has been sent from the pHLR of the InfoMobile A 200, and sends an acknowledgment message in response to the synchronization request message to the InfoMobile A 200 (S704). Furthermore, the pHLR of the InfoMobile B 300 updates its own subscriber information and, thereafter, provides the subscriber information, which is updated to synchronize the subscriber information, for the pVLR in the pBSC so that the subscriber information, namely, the position information of the wireless terminal is altered and registered (S705).

The pHLR of the InfoMobile A 200 resets a modification flag for the associated subscriber information depending on the acknowledgment message sent from the pHLR of the InfoMobile B 300 over the IP network, such that synchronizing the subscriber information for the wireless terminal having the altered position information has been completed, thus permitting a variety of call services such as a home call and an office line call for the wireless terminal of which the position has been moved (S706).

One example for a structure of the synchronization request message for synchronizing between HLRs inter-worked over the IP network and a structure of the acknowledgment message to the synchronization request in the above-described synchronization process are shown below. The data type comprised in the message is contained in the table of FIG. 15.

```
typedef struct
{
    unsigned char msg_from;      // 0x00:hlr_srv, 0x01:other hlr_sync
    unsigned char msg_type;      // 0x0a:Add, 0x0c:Change, 0x0d:Delete
    unsigned char req_ack;       // 0x00:Req., 0x01:Ack
    unsigned char src_hlr_id;    // the self hlr id
    unsigned char dst_hlr_id;    // dest hlr id (0–3)
    unsigned char rsvd1;         // reserved for resolution
    unsigned short hlr_index;    // hlr index
    unsigned char data[sizeof(MSC_VLR_DB_BUF)];
    // hlr_db_data 152 bytes
    unsigned char rsvd[40];      // reserved
}SYNC_MSG; // Total 200 bytes
```

The above-stated synchronization request and synchronization acknowledgment messages can comprise message separator information, message type information, synchronization request or acknowledgment separating information, the self HLR ID information, destination (party) HLR ID information, synchronization subscriber information for actual synchronization, and the like, as shown in FIG. 15. The message type information comprises type information such as subscriber information addition, subscriber information modification, and subscriber information deletion.

Hereinafter, roaming service and SMS service operations between multi-zone arrangement InfoMobile systems in accordance with an embodiment of the present invention will be separately described below.

First, the roaming service operation between multi-zone arrangement InfoMobile systems will be described for each embodiment with reference to FIG. 2. An explanation of a home call service between wired or wireless terminals within a service zone of an associated InfoMobile system has been omitted since an operation of the service conventional.

A first embodiment of the roaming service according to the present invention has a roaming service operation where a wireless terminal BI registered in zone 1 (InfoMobile Zone 1) shown in FIG. 2 moves into zone 2 (InfoMobile Zone 2).

First, in order to perform the roaming service according to the present invention, initial subscriber information synchronization between respective InfoMobile systems as shown in FIGS. 13 and 14 must be performed in advance.

Given that such initial subscriber synchronization between HLRs of the InfoMobile systems in respective zones has occurred, if the wireless terminal A1 registered in the InfoMobile system 200 in zone 1 moves into the service area of the InfoMobile system 300 in zone 2, the moved wireless terminal sends its own position registration message to the pBSC 320 via the BTS 310 of the InfoMobile system 300 in zone 2.

The pBSC 320 analyzes the position registration message sent from the wireless terminal A1 and compares the current position of the wireless terminal A1 with the position information of the wireless terminal A1 registered in the VLR and HLR 330.

If the registered position information and the current position information of the wireless terminal A1 are different from each other, the pBSC 320 modifies the user registration information (position information) of the VLR and the HLR 330.

As such, when the subscriber information of the VLR and the HLR 330 of the InfoMobile system 300 has been modified, the HLR synchronization will be performed to synchronize the modified subscriber information between the InfoMobile systems 100 in respective zones that are interfaced with the InfoMobile system 300. Since a method for HLR synchronization of the modified subscriber information depending on the position registration alteration has been described in detail in the explanation of the above-illustrated FIGS. 11 and 14, an explanation thereof has been omitted. The HLR synchronization between respective systems is effected over the IP network.

After the position information modification registration of the HLR and VLR has been completed through the HLR synchronization between the interfaced InfoMobile systems depending on the registered position modification, when the call origination is requested from the wireless terminal A1, registered in the InfoMobile system 200 in zone 1 and positioned in the current zone 1, to the wireless terminal A2 positioned in the current zone 2 a call request signal is sent to the pBSC 220 via the BTS 210 of the InfoMobile system 200.

The pBSC 220 confirms the position information of the wireless terminal B1 via the VLR and requests call origination to the InfoMobile system including the service area of an associated position according to the confirmed position information of the wireless terminal B1.

That is, the pBSC 220 of the InfoMobile system 200 confirms the current position information of the wireless terminal A2 via the VLR, and provides a call request signal of the wireless terminal A1 positioned in zone 1 to the PBX 240 since the current position of the wireless terminal A2 is modified and registered in zone 2 through the synchronization process.

The PBX 240 sends the call request signal of the wireless terminal A1, provided from the pBSC 220, to the PBX 340 of the InfoMobile system 300 in zone 2 via the INI dedicated line.

The PBX 340 sends an associated signal via the pBSC 320 and the BTS 310 to the wireless terminal B1 that has moved into the service area of the InfoMobile system 300 in zone 2 in response to the call request signal from the InfoMobile system 200, such that a channel is established for voice communication between the wireless terminal A1 in zone 1 and the wireless terminal A2 that has moved into zone 2.

Roaming service according to the second embodiment of the present invention has a roaming service operation between the wireless terminals A1 and A2 when the wireless terminal A2, registered in zone 2 shown in FIG. 2 and the wireless terminal A1 registered in zone 1, moves into zone 2.

First, if the wireless terminal A1 registered in the InfoMobile system 200 in zone 1 moves into a service area of the InfoMobile system 300 in zone 2, the moved wireless terminal A1 sends its own position registration message to the pBSC 320 via the BTS 310 of zone 2 InfoMobile system 300.

The pBSC 320 analyzes the position registration message sent from the wireless terminal A1 and compares the current position of the wireless terminal A1 with the position information of the wireless terminal A1 registered in the VLR and the HLR 330.

If the registered position information and the current position information of the wireless terminal A1 are different from each other, pBSC 320 modifies the user registration information (position information) of the VLR and the HLR 330.

Thus, if the subscriber information in the VLR and the HLR 330 of the InfoMobile system 300 is modified, the HLR synchronization for synchronizing the modified subscriber between the InfoMobile systems 200 in respective zones interfaced with the InfoMobile system 300 is performed. The method for HLR synchronization of the subscriber information modification depending on the registered position modification has been described in detail above in the explanation of FIGS. 11 and 14 and, therefore, an explanation thereof has been omitted. The HLR synchronization between respective systems is effected over the IP network.

After the position information modification and registration of the HLR and VLR has been completed through the HLR synchronization between the interfaced InfoMobile systems depending on the position registration modification, the wireless terminal is registered in the InfoMobile system 300 in zone 2. If the call origination is requested from the wireless terminal A2 that is currently positioned in zone 2 to the wireless terminal A1 that has moved from zone 1 to zone 2, the call service is effected by the same method as the call service operation between the wireless terminals registered in the same zone.

As a result, in the second embodiment, the wireless terminal registered in zone 1 moves into zone 2 and then performs a call service to a terminal registered in zone 2, wherein if the wireless terminal registered in zone 1 moves into zone 2, the wireless terminal that has moved into zone 2 sends the position registration message to the pBSC 320 of the InfoMobile system 300 in zone 2 to modify the user registration information of the VLR and the HLR 330 of the InfoMobile system 300 in zone 2 and to perform synchronization on the modified information to HLRs of interfaced InfoMobile systems in all zones, and thus, the call service is performed by the same method as the method for the call service between the wireless terminals registered in the same zone.

A third embodiment of roaming service according to the present invention is an embodiment in which, when a wireless terminal A1 registered in the InfoMobile system 200 in zone 1 moves into the InfoMobile system 300 in zone 2, it provides an office line call service between the moved wireless terminal A1 and a wired terminal connected to the PSTN.

First, as shown in FIG. 2, when the wireless terminal A1 has moved into zone 2, a call originating operation from the wireless terminal A1, which is registered in zone 1 and has moved into zone 2, to the wired terminal connected to the PSTN is described below.

As shown in FIG. 2, when the wireless terminal A1 registered in the InfoMobile system 200 in zone 1 has moved into the service area of the InfoMobile system 300 in zone 2, the moved wireless terminal A1 sends its own position registration message to the pBSC 320 via the BTS 310 of the InfoMobile system 300 in zone 2.

The pBSC 320 analyzes the position registration message transferred from the wireless terminal A1 and compares the current position of the wireless terminal A1 with the position information of the wireless terminal A1 registered in the VLR and the HLR 330.

If the registered position information and the current position information of the wireless terminal A1 are different from each other, the pBSC 320 modifies the user registration information (i.e., position information) in the VLR and the HLR 330.

When the subscriber information in the VLR and the HLR 330 of the InfoMobile system 300 has been modified, for the purpose of the synchronization of the modified subscriber information between the InfoMobile systems 200 in respective zones inter-worked with the InfoMobile system 300, HLR synchronization is performed. A method for HLR synchronization of subscriber information modification depending on the position registration modification has been described by way of the explanation of FIGS. 11 and 14 and, therefore, an explanation thereof has been omitted. The HLR synchronization between respective systems is performed over the IP network.

After the position information modification registration in the HLR and VLR has been completed through the HLR synchronization between interfaced InfoMobile systems depending on the registered position modification, the BTS 310 of the InfoMobile system 300 provides the pBSC 320 with a call signal originated from the wireless terminal A1 when call origination from the wireless terminal A1 moved into the InfoMobile system 300 in zone 2 is requested to the wired terminal E connected to the PSTN.

The pBSC 320 determines whether the call request signal of the wireless terminal A1, transferred from the BTS 310, is an outdoor call or an indoor call. The call determination is performed in the BTMR of the pBSC 320, although not shown in the drawing figures.

If the BTMR of the pBSC 320 determines that the call requested by the wireless terminal A1 is an outdoor call, namely, the call request signal to the wired terminal E, then the call request signal is provided for the PBX 340.

Accordingly, the PBX 340 connects the call to the wired terminal E over the PSTN according to the call request signal of the wireless terminal A1.

As a result, when the wireless terminal A1 first registered in the InfoMobile system 200 in zone 1 moves into zone 2, a call service is typically performed by the same method as a call connection operation to a wireless terminal registered in an arbitrary InfoMobile system because the subscriber information including its position information is synchronized between VLR and HLR of the InfoMobile system in respective zones.

On the contrary, when a call is requested to the wireless terminal A1 moved from the wired terminal E connected to PSTN to zone 2 after a subscriber information synchronization process between a VLR and an HLR of each Info-Mobile system is completed as described above.

If there is a call requested from the wired terminal E connected to the PSTN to the wireless terminal A1, the call request signal is provided for the PBX 240 of the private wireless network system 200 in zone 1 over the PSTN. Here, the wireless terminal A1 is positioned in zone 2. The reason of sending the call request signal to the PBX 240 of the private wireless network system 200 in zone 1 is that, in the PSTN network, the wireless terminal A1 is the private wireless network system 200 in the registered zone. That is, it is because the subscriber information (i.e., the position information of the wireless terminal) is not shared with the PSTN network.

The PBX 240 of the private wireless network system 200 receives the call request signal of the wired terminal sent over the PSTN, and identifies the current position of the wireless terminal A1 from the VLR information of the HLR 230 and pBSC 220 which is periodically updated.

The pBSC 220 of the private wireless network system 200, which has identified the current position of the wireless terminal A1, provides the PBX 240 with the call request signal, and the PBX 240 of the private wireless network system 200 sends the call request signal via the INI dedicated line to the PBX 340 of the private wireless network system 300 in the zone where the wireless terminal A1 is currently positioned.

The PBX 340 of the private wireless network system 300 establishes a communication channel with the wireless terminal A1, which has moved into zone 2, via the pBSC 320 and BTS 310 to establish a call connection in response to the call request signal sent from the PBX 240 of the private wireless network system 200.

A method for SMS transmission between private wireless network systems in a multi-zone arrangement according to an embodiment of the present invention is described below for each embodiment.

The first embodiment is for a method in which, when a subscriber wireless terminal of an InfoMobile system in a zone 1 moves into a service area of an InfoMobile system in zone 2, a wired terminal subscriber in zone 1 sends an SMS to the wireless terminal that has moved into zone 2.

First, given that initial subscriber synchronization between HLRs of InfoMobile systems in respective zones has occurred, if the wireless terminal A1 registered in the InfoMobile system 200 in zone 1 moves into the service area of the InfoMobile system 300 in zone 2, the moved wireless terminal A1 sends its own position registration message via the BTS 310 of the InfoMobile system 300 in zone 2 to the pBSC 320.

The pBSC 320 analyzes the position registration message sent from the wireless terminal A1 and compares a current position of the wireless terminal A1 with position information of the wireless terminal A1 registered in the VLR and the HLR 330.

If the registered position information and the current position information of the wireless terminal A1 are different from each other, the pBSC 320 modifies the user registration information (i.e., position information) in the VLR and the HLR 330.

If the subscriber information in the VLR and the HLR 330 of the InfoMobile system 300 is modified, HLR synchronization for synchronizing the modified subscriber between the InfoMobile systems 200 in the respective zones interfaced with the InfoMobile system 300 is performed. The HLR synchronization method for the subscriber information modification depending on the position registration modification has been described in detail, and therefore, an explanation thereon has been omitted.

An SMS transmission request from a wired terminal 250, registered in the InfoMobile system 200 in zone 1, is forwarded to a wireless terminal A1 that has moved into the current zone 2, after the position information alteration registration of the HLR and VLR has been completed through the HLR synchronization between the interfaced InfoMobile systems depending on the position registration modification.

That is, when there is the SMS transmission request from the wired terminal 250 registered in the InfoMobile system 200 in zone 1 to the wireless terminal A1 that has moved into the InfoMobile system 300 in zone 2, an SMS transmission request signal is provided for an SMS server 260 of the InfoMobile system 200 in zone 1 over the IP network.

The SMS server 260 retrieves a database 266 synchronized to the HLR 230 in response to the SMS transmission request signal provided from the wired terminal 250 to identify the current position information of the wireless terminal A1 to which an SMS is to be transferred, as shown in FIG. 3. When the wireless terminal A1 moves from zone 1 to zone 2, the HLR synchronization between the systems is effected so that the position information of the wireless terminal A1 is updated in the HLR 230, and the position information of the associated wireless terminal A1 is also updated through the subscriber information synchronization unit 265 shown in FIG. 3 between the HLR 230 and the database 266 in the SMS server 260.

If the position of the wireless terminal has been identified, an IP address of the pBSC 320 of the InfoMobile system 300, where the wireless terminal A1 is positioned, is retrieved and an associated SMS message is sent to the pBSC 320 of the InfoMobile system 300 with the retrieved IP address. An operation for processing an SMS message in the SMS server 260 has been described above in connection with FIGS. 3 and 4 and, therefore, an explanation thereof has been omitted.

The pBSC 320 of the InfoMobile system 300 in zone 2, which has received the SMS message over the IP network, sends the received SMS message via BTS 310 to an associated wireless terminal, namely, the wireless terminal A1.

As a result, when a user of the InfoMobile system of the multi-zone arrangement moves into a service area of another InfoMobile system in the associated multi-zone arrangement, automatic SMS incoming operation is possible in the InfoMobile system into which the user has moved without a user setting specific options, by reading from the database the HLR information periodically updated through the HLR information synchronization between systems and through the synchronization between an HLR in the system and the database shown in FIG. 2.

Furthermore, a method in which a wired terminal subscriber of the InfoMobile system in zone 1 sends an SMS to a wireless terminal registered in the InfoMobile system in zone 2 is also performed through the same method as described above and, therefore, an explanation thereof has been omitted.

The second embodiment is a method in which, when a subscriber wireless terminal of an InfoMobile system in zone 2 moves into a service area of a InfoMobile system in zone 1, a wired terminal subscriber in zone 1 transmits an SMS to the wireless terminal which has moved to a service area of the InfoMobile system in zone 1.

First, given that initial subscriber synchronization between HLRs of the InfoMobile systems in respective zones has been completed, if the wireless terminal registered in the InfoMobile system 300 in zone 2 moves into the service area of the InfoMobile system 200 in zone 1, the moved wireless terminal sends its own position registration message to the pBSC 220 via the BTS 210 of the InfoMobile system 200 in zone 1.

The pBSC 220 analyzes a position registration message sent from the wireless terminal and compares a position of the current wireless terminal with the position information of the wireless terminal registered in the VLR and the HLR 230.

If the registered position information and the current position information of the wireless terminal are different from each other, the pBSC 220 modifies user registration information (position information) of the VLR and the HLR 230.

Thus, if the subscriber information of the VLR and the HLR 230 of the InfoMobile system 200 is modified, HLR synchronization for the modified subscriber information is performed between the InfoMobile system 200 and the inter-worked InfoMobile system 300 in each zone.

After the position information modification registration of the HLR and VLR has been completed through HLR synchronization between interfaced InfoMobile systems depending on registered position modification, there is an SMS transmission request from the wired terminal 250 registered in the InfoMobile system 200 in zone 1 to the wireless terminal which moves into the service area of the InfoMobile system 200 in the current zone 1.

That is, if there is an SMS transmission request to a wireless terminal that has moved from the wired terminal 250 registered in the InfoMobile system 200 in zone 1 to the InfoMobile system 200 in zone 1, the SMS transmission request signal is provided over the IP network to the SMS server 260 of the InfoMobile system 200 in zone 1.

The SMS server 260 retrieves the database 266 synchronized to the HLR 230 in response to the SMS transmission request signal provided from the wired terminal 250 and identifies the current position information of the wireless terminal to which the SMS is to be sent, as shown in FIG. 3. When the wireless terminal moves from zone 2 to zone 1, HLR synchronization between the systems is effected such that the position information of the wireless terminal is updated in HLR 230 and between the HLR 230 and a database 266 in the SMS server 260, and the position information of the associated wireless terminal is updated through the subscriber information synchronization unit 265 shown in FIG. 2.

If the position of the wireless terminal has been determined, the IP address of the pBSC 220 of the InfoMobile system 200, where the wireless terminal is positioned, is retrieved and an associated SMS message is sent to the pBSC 220 of the InfoMobile system 200 toward the retrieved IP address. An explanation on the operation for SMS message processing in the SMS server 260 has been included above in the description of FIGS. 3 and 4 and therefore, an explanation thereof has been omitted.

The pBSC 220 of the InfoMobile system 200 in zone 1 receiving the SMS message over the IP network sends the received SMS message via the BTS 210 to the associated wireless terminal, which has moved from zone 2 to zone 1.

The third embodiment is a method of transmitting an SMS upon setting a multiple destination function. That is, a method where an SMS transmission is simultaneously requested to both an indoor terminal (i.e., wired terminal) and a wireless terminal positioned in one zone.

First, if there is an SMS transmission request from a wired terminal 250, registered in the InfoMobile system 200 in zone 1, to both an indoor terminal and a wireless terminal A1, an SMS transmission request signal is provided for an SMS server 260 of the InfoMobile system 200 in zone 1 over the IP network.

The SMS server 260, as shown in FIG. 3, retrieves the database 266 synchronized to the HLR 230 in response to the SMS transmission request signal provided from the wired terminal 250, and identifies current position information of the wireless terminal, to which an SMS is to be transferred, and subscriber information of the indoor terminal.

If the wireless terminal is positioned in zone 1 and the indoor terminal is also registered in the InfoMobile system 200 in zone 1, the SMS server 260 provides the SMS message for the pBSC 220 of the InfoMobile system 200.

The pBSC 220 sends the SMS message, provided from the SMS server 250, via the BTS 210 to the wireless terminal, and also sends the SMS message to the PBX 240 to send the SMS message to the indoor terminal connected to the PBX 240.

When a wireless terminal registered in a private wireless network system in a multi-zone arrangement moves into the service area of a private wireless network system in any zone, SMS service is available by the method in the above-noted first and second embodiments, and multiple SMS service to an indoor terminal and a wireless terminal in any zone is also available by the same method as that of the above-noted embodiments.

As a result, in the third embodiment, the home terminal (DGP) sends an associated SMS message via the PBX, and the wireless terminal sends the SMS message via the BTS of the InfoMobile system.

Furthermore, for an InfoMobile user included in the multi-zone arrangement, even when the user moves into a service area of another InfoMobile system in the multi-zone arrangement, the SMS service is available from the method of the above-noted embodiment.

As a result, when an InfoMobile service user in one zone has moved into a service area of the other InfoMobile system in the InfoMobile system included in a multi-zone arrangement, a method and system for roaming and SMS services between the private wireless network systems according to an embodiment of the present invention allows receiving the home wireless call incoming and originating services and an SMS service in an associated zone automatically without a user's additional option settings. This is because it is possible to identify position information of the wireless terminal in the pBSC from DB information of the HLR updated through position registration of the terminal, synchronization between an HLR and an HLR of the system, synchronization between the VLR in the system and the HLR, and synchronization between the HLR in the system and the subscriber information database in an SMS server for an SMS service. The pBSC can support automatic roaming and SMS services by forwarding a call and an SMS data call to an associated InfoMobile system using such position information of the terminal.

According to a method and system for short message service between private wireless network systems in a multi-zone arrangement of the present invention as described above, when in the InfoMobile system included in a multi-zone arrangement, when an InfoMobile service user in a zone has moved into a service area of another InfoMobile system, he can receive a home wireless call receiving and originating services in the associated zone automatically without the user's additional option setting. This is possible because the position information of the terminal can be identified at a pBSC through both synchronization between HLRs and synchronization between a VLR and an HLR with respect to DB information in the HLR updated by the position registration of the terminal. The pBSC supports an automatic roaming service by forwarding a call to an associated InfoMobile system using such terminal position information.

Furthermore, a home SMS message transmission service zone, which has been conventionally limited to one InfoMobile, can be extended to the multi-zone arrangement by allowing SMS message transmission between InfoMobile systems composed in a multi-zone arrangement.

Although SMS transmission has been not permitted when the user departs from an associated InfoMobile zone, an SMS incoming function is supported regardless of the position of the user when the user is in the multi-zone arrangement, thereby ensuring maximum mobility to the user, by enhancing the user's mobility between InfoMobile systems composed in the multi-zone arrangement.

Upon a user moving between InfoMobile systems included in the multi-zone arrangement, SMS incoming operation in the associated InfoMobile system zone also becomes possible automatically without a user's additional option setting, by reading HLR DB information, periodically updated in an SMS server, to identify the position of the user.

Moreover, the SMS incoming function is simultaneously supported to an indoor terminal (DGP) as well as to a user terminal upon multiple destination function (option) setting.

What is claimed is:

1. A method comprising:
   synchronizing subscriber information databases over a network with respect to subscriber information of each subscriber registered among a plurality of wireless network systems in a multi-zone arrangement; and
   upon a Short Message Service (SMS) transmission request signal from a first terminal to at least one second terminal being received, forming data packets of an SMS message in accordance with the received SMS transmission request signal, and retrieving the synchronized subscriber information database to send the formed SMS data packets over the network to a wireless network system corresponding to current position information of the at least one second terminal;
   wherein synchronizing subscriber information databases comprises:
   a first synchronization to synchronize the subscriber information between Home Location Registers (HLRs) of the wireless network systems in the multi-zone arrangement over the network; and
   a second synchronization step to synchronize the subscriber information between SMS databases of SMS servers in associated wireless network systems where each of the HLRs is positioned after the first synchronization between the respective HLRs has been completed; and
   wherein the first synchronization comprises:
   an initial synchronization between the HLRs over an Internet Protocol (IP) network with respect to subscriber information of a terminal registered in its own system upon initial setup of the wireless network systems in the multi-zone arrangement, the synchronization being in accordance with a set system ID;
   synchronization of the subscriber information upon a request to alter or delete the subscriber information from a user through a User Interface (UI) after the initial synchronization has been completed, the synchronization being performed by updating the HLR of the system with the altered or deleted subscriber information and, thereafter, by sending the updated subscriber information to the HLRs of interfaced wireless network systems in respective zones in accordance with the set system ID over the IP network; and
   synchronization of the subscriber information due to position registration modification upon a position registration message being received from an arbitrary wireless terminal after the initial synchronization process has been completed, the synchronization being performed by updating position registration and subscriber information in its own HLR and, thereafter, by sending the updated subscriber information to each of the interfaced wireless network systems in the multi-zone arrangement over the IP network, upon a determination that the wireless terminal has moved from a service area of the system in which the wireless terminal has been registered to its own service area based on position information of the received message.

2. The method of claim 1, wherein the first terminal comprises one of wired and wireless terminals registered in the wireless network system for requesting transmission of SMS messages, and wherein the at least one second terminal comprises one of wired and wireless terminals for receiving SMS messages.

3. A plurality of wireless network systems in a multi-zone arrangement in a network, each of the plurality of wireless network systems comprising:

a synchronizer adapted to synchronize subscriber information databases over the network with respect to subscriber information of each subscriber registered among a plurality of wireless network systems; and a Short Message Service (SMS) message processor adapted to form data packets of an SMS message in accordance with a received SMS transmission request signal, and to access the synchronized subscriber information database to send the formed SMS data packets over the network to a wireless network system corresponding to current position information of at least one second terminal, upon the SMS transmission request signal from a first terminal being received by the at least one second terminal;

wherein the synchronizer is adapted to perform:

an initial synchronization between subscriber information databases of the interfaced wireless network systems over the IP network with respect to subscriber information of a terminal registered in its own system upon initial setup of the wireless network systems in the multi-zone arrangement, the synchronization being in accordance with a set system ID;

synchronization of the subscriber information upon a request to alter or delete the subscriber information from a user through a User Interface (UI) after the initial synchronization has been completed, the synchronization being performed by updating its own subscriber information database with the altered or deleted subscriber information and by then sending the updated subscriber information to the subscriber information databases of interfaced wireless network systems in respective zones in accordance with the set system ID over the IP network; and synchronization of the subscriber information due to position registration modification upon a position registration message being received from an arbitrary wireless terminal after the initial synchronization process has been completed, the synchronization being performed by updating position registration and subscriber information in its own subscriber information database and, thereafter, by sending the updated subscriber information to each of the interfaced wireless network systems in the multi-zone arrangement over the IP network, upon a determination that the wireless terminal has moved from a service area of the system on which the wireless terminal has been registered to its own service area based on position information of the received message.

4. The plurality of wireless network systems of claim 3, wherein the first terminal comprises one of wired and wireless terminals registered in the wireless network system for requesting transmission of the SMS message, and the at least one second terminal comprises one of wired and wireless terminals for receiving the SMS message.

5. A plurality of wireless network systems in a multi-zone arrangement in a network, each of the plurality of wireless network systems comprising:

a synchronizer adapted to synchronize subscriber information databases over the network with respect to subscriber information of each subscriber registered among a plurality of wireless network systems; and a Short Message Service (SMS) message processor adapted to form data packets of an SMS message in accordance with a received SMS transmission request signal, and to access the synchronized subscriber information database to send the formed SMS data packets over the network to a wireless network system corresponding to current position information of at least one second terminal, upon the SMS transmission request signal from a first terminal being received by the at least one second terminal;

wherein the SMS message processor comprises:

an SMS database adapted to store the same subscriber information as the subscriber information stored in the subscriber information database;

a synchronization processor adapted to periodically access the subscriber information database to read the subscriber information stored in the subscriber information database and to update the SMS database to synchronize the subscriber information;

and wherein the SMS message processor is adapted to perform:

forming the data packets of the SMS message according to a received SMS transmission request signal and, thereafter, temporarily storing the formed SMS message data packets into a message queue, upon the SMS transmission request signal from the first terminal to the at least one second terminal being received over the network, and retrieving current position information of the at least one second terminal to which the SMS message is to be sent and an IP address of an interfaced wireless network system corresponding to the current position by accessing the SMS database, and sending the SMS message data packets stored in the message queue to the retrieved IP address over the network.

6. The plurality of wireless network systems of claim 5, wherein the subscriber information database comprises at least one of a Home Locator Register (HLR) and a Visitor Location Register (VLR).

* * * * *